(12) United States Patent
Burrows

(10) Patent No.: US 12,497,824 B2
(45) Date of Patent: *Dec. 16, 2025

(54) OPTICAL DEVICE WITH AEROGEL TILING TECHNOLOGY

(71) Applicant: Cardinal CG Company, Eden Prairie, MN (US)

(72) Inventor: Keith James Burrows, Mineral Point, WI (US)

(73) Assignee: Cardinal CG Company, Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/390,178

(22) Filed: Jul. 30, 2021

(65) Prior Publication Data

US 2022/0042369 A1 Feb. 10, 2022

Related U.S. Application Data

(60) Provisional application No. 63/062,910, filed on Aug. 7, 2020.

(51) Int. Cl.
*E06B 3/67* (2006.01)
*B32B 17/06* (2006.01)
(Continued)

(52) U.S. Cl.
CPC ............ *E06B 3/6715* (2013.01); *B32B 17/06* (2013.01); *E06B 3/6612* (2013.01); *B32B 2266/126* (2016.11); *E06B 3/66304* (2013.01)

(58) Field of Classification Search
CPC ......... Y02A 30/249; Y02B 80/22; E06B 3/66; E06B 3/6612; E06B 3/67; E06B 3/6715;
(Continued)

(56) References Cited

U.S. PATENT DOCUMENTS

| | | | |
|---|---|---|---|
| 4,402,927 A | 9/1983 | Von Dardel et al. |
| 4,610,863 A | 9/1986 | Tewari et al. |

(Continued)

FOREIGN PATENT DOCUMENTS

| | | | |
|---|---|---|---|
| AU | 688208 B2 | 3/1998 |
| CA | 2036634 A1 | 9/1991 |

(Continued)

OTHER PUBLICATIONS

Machine translation of CN 109502997 A, obtained from EspaceNet (Year: 2023).*

(Continued)

*Primary Examiner* — Z. Jim Yang
(74) *Attorney, Agent, or Firm* — Fredrikson & Byron, P.A.

(57) ABSTRACT

The invention provides an optical device comprising a glass assembly unit. The glass assembly unit comprises two glass sheets and a plurality of aerogel sheets. The aerogel sheets are arranged in a tiled configuration between the two glass sheets so as to cover a majority of a unit area of the glass assembly unit. In some embodiments, the tiled configuration is characterized by each of the aerogel sheets being spaced from an adjacent one of the aerogel sheets by a gap distance of no greater than 5 mm. In other embodiments, the tiled configuration is characterized by each of the aerogel sheets being in edge-to-edge contact with at least one adjacent aerogel sheet.

16 Claims, 10 Drawing Sheets

(51) Int. Cl.
*E06B 3/66* (2006.01)
*E06B 3/663* (2006.01)

(58) Field of Classification Search
CPC . E06B 3/677; E06B 3/6775; B32B 2307/102; B32B 2307/304; B32B 17/10–1099
See application file for complete search history.

(56) References Cited

U.S. PATENT DOCUMENTS

| | | | |
|---|---|---|---|
| 4,765,818 | A | 8/1988 | Che et al. |
| 4,928,448 | A | 5/1990 | Phillip |
| 5,027,574 | A | 7/1991 | Phillip |
| 5,092,101 | A | 3/1992 | Kunert |
| 5,118,543 | A | 6/1992 | Mccoll |
| 5,119,608 | A | 6/1992 | Glover et al. |
| 5,154,953 | A | 10/1992 | de Moncuit et al. |
| 5,156,895 | A * | 10/1992 | Martin ............. F16L 59/04 428/116 |
| 5,242,647 | A | 9/1993 | Poco |
| 5,294,480 | A | 3/1994 | Mielke et al. |
| 5,524,381 | A | 6/1996 | Chahroudi |
| 5,525,430 | A | 6/1996 | Chahroudi |
| 6,627,305 | B1 | 9/2003 | Deane et al. |
| 7,117,914 | B2 | 10/2006 | Chick |
| 7,143,800 | B2 | 12/2006 | Chick |
| 7,339,728 | B2 | 3/2008 | Hartig |
| 7,342,716 | B2 | 3/2008 | Hartig |
| 7,572,509 | B2 | 8/2009 | Hartig |
| 7,572,510 | B2 | 8/2009 | Hartig |
| 7,572,511 | B2 | 8/2009 | Hartig |
| 7,780,890 | B2 | 8/2010 | Lee et al. |
| 7,832,177 | B2 | 11/2010 | Stark |
| 7,906,203 | B2 | 3/2011 | Hartig |
| 7,919,158 | B2 | 4/2011 | Seth et al. |
| 8,110,258 | B2 | 2/2012 | Milburn |
| 8,381,490 | B2 | 2/2013 | Back et al. |
| 8,557,356 | B2 | 10/2013 | Colson |
| 8,595,994 | B1 | 12/2013 | Grommesh et al. |
| 8,652,282 | B2 | 2/2014 | Milburn |
| 8,844,218 | B2 | 9/2014 | Showers |
| 8,968,865 | B2 | 3/2015 | Worsley et al. |
| 9,034,934 | B1 | 5/2015 | Attia |
| 9,045,609 | B2 | 6/2015 | Pasquero et al. |
| 9,068,346 | B1 | 6/2015 | Lu et al. |
| 9,249,272 | B2 | 2/2016 | Pasquero et al. |
| 9,862,640 | B2 | 1/2018 | Pfaff et al. |
| 10,000,411 | B2 | 6/2018 | Burrows et al. |
| 10,000,965 | B2 | 6/2018 | Burrows et al. |
| 10,421,253 | B2 | 9/2019 | Van Overmeere et al. |
| 10,500,557 | B2 | 12/2019 | Sakaguchi et al. |
| 2002/0102674 | A1 | 8/2002 | Anderson |
| 2005/0074566 | A1 * | 4/2005 | Rouanet ............. E04C 2/54 428/34 |
| 2007/0082124 | A1 | 4/2007 | Hartig |
| 2008/0258065 | A1 | 10/2008 | Banks |
| 2008/0302059 | A1 * | 12/2008 | Du Plessis ............. E06B 3/6775 29/463 |
| 2009/0029147 | A1 | 1/2009 | Tang et al. |
| 2009/0068384 | A1 * | 3/2009 | Seth ................. B32B 17/10055 428/34 |
| 2010/0146880 | A1 * | 6/2010 | Valentz ............... E04C 2/543 52/745.15 |
| 2011/0206874 | A1 * | 8/2011 | Showers ............. E06B 3/6715 428/34.1 |
| 2012/0081794 | A1 * | 4/2012 | Showers ............. E06B 3/6604 359/893 |
| 2012/0128958 | A1 | 5/2012 | Zeng et al. |
| 2013/0101789 | A1 * | 4/2013 | Lubart .................. B32B 15/00 428/137 |
| 2013/0136664 | A1 | 5/2013 | Bono et al. |
| 2013/0170218 | A1 | 7/2013 | Mazurek et al. |
| 2013/0202890 | A1 | 8/2013 | Kong et al. |
| 2014/0065329 | A1 * | 3/2014 | Showers ............. E06B 3/6612 428/34 |
| 2014/0116516 | A1 * | 5/2014 | Jones .................. F17D 1/00 137/565.23 |
| 2014/0141199 | A1 * | 5/2014 | Leonard ............... B32B 3/26 428/317.9 |
| 2014/0287641 | A1 | 9/2014 | Steiner |
| 2015/0004087 | A1 | 1/2015 | Zettl et al. |
| 2015/0077957 | A1 * | 3/2015 | Sakatani ............. B32B 25/02 428/317.1 |
| 2015/0315779 | A1 | 11/2015 | Baily et al. |
| 2016/0097502 | A1 * | 4/2016 | Padiyath ............. B32B 17/1044 359/592 |
| 2016/0138323 | A1 | 5/2016 | Snderkr et al. |
| 2016/0138324 | A1 * | 5/2016 | Lameris ............. E06B 3/66342 52/786.13 |
| 2016/0160557 | A1 | 6/2016 | Kim et al. |
| 2016/0319588 | A1 * | 11/2016 | Samanta ............. C01B 33/159 |
| 2017/0028686 | A1 | 2/2017 | Wilson et al. |
| 2018/0066469 | A1 * | 3/2018 | Vogel-Martin ...... E06B 3/66304 |
| 2018/0093456 | A1 * | 4/2018 | Van Overmeere ........ B32B 3/26 |
| 2018/0134194 | A1 * | 5/2018 | Kawamura ............. B32B 5/022 |
| 2018/0166353 | A1 | 6/2018 | Garner et al. |
| 2018/0237608 | A1 | 8/2018 | Hess et al. |
| 2018/0250913 | A1 | 9/2018 | Kotake et al. |
| 2018/0264784 | A1 * | 9/2018 | Murofushi ........ B32B 17/10633 |
| 2018/0320824 | A1 * | 11/2018 | Fay .......................... B32B 3/266 |
| 2019/0063146 | A1 | 2/2019 | Freese et al. |
| 2019/0154188 | A1 * | 5/2019 | Fujii ........................ B32B 7/12 |
| 2019/0333490 | A1 * | 10/2019 | Wang ................... G10K 11/168 |
| 2020/0148587 | A1 | 5/2020 | Burrows et al. |
| 2020/0340612 | A1 * | 10/2020 | Kawamura ............. B32B 3/266 |
| 2021/0094255 | A1 * | 4/2021 | Benkoski .................. B32B 5/02 |
| 2021/0207428 | A1 * | 7/2021 | Pilon ......................... B32B 7/12 |
| 2021/0363812 | A1 * | 11/2021 | Hajjaj ................... E06B 3/6707 |
| 2022/0042370 | A1 | 2/2022 | Burrows |
| 2022/0332633 | A1 | 10/2022 | Burrows et al. |
| 2022/0369480 | A1 * | 11/2022 | Sage ....................... F24C 7/086 |
| 2023/0050347 | A1 | 2/2023 | Kitzman et al. |
| 2024/0313302 | A1 | 9/2024 | Williams et al. |

FOREIGN PATENT DOCUMENTS

| | | | |
|---|---|---|---|
| CN | 101481985 A | 7/2009 | |
| CN | 102180603 A | 9/2011 | |
| CN | 202706291 U | 1/2013 | |
| CN | 104898295 A | 9/2015 | |
| CN | 105201355 A | 12/2015 | |
| CN | 204936377 U | 1/2016 | |
| CN | 205117117 U | 3/2016 | |
| CN | 205117118 U | 3/2016 | |
| CN | 106082697 A | 11/2016 | |
| CN | 205736249 U | 11/2016 | |
| CN | 206581820 U | 10/2017 | |
| CN | 206581822 U | 10/2017 | |
| CN | 206589417 U | 10/2017 | |
| CN | 206983435 U | 2/2018 | |
| CN | 207190441 U | 4/2018 | |
| CN | 108060874 A | 5/2018 | |
| CN | 108623194 A * | 10/2018 | ............ B32B 17/06 |
| CN | 108625741 A | 10/2018 | |
| CN | 109502997 A * | 3/2019 | ............ C03C 27/10 |
| CN | 109592908 A | 4/2019 | |
| CN | 109989680 A | 7/2019 | |
| CN | 211257362 U | 8/2020 | |
| CN | 112431520 A | 3/2021 | |
| EP | 1414266 A2 | 4/2004 | |
| EP | 3112773 A1 | 1/2017 | |
| GB | 2241468 A | 9/1991 | |
| KR | 101583005 B1 * | 1/2016 | |
| WO | 2006065904 A1 | 6/2006 | |
| WO | 2006121954 A2 | 11/2006 | |
| WO | WO-2008047027 A1 * | 4/2008 | ............ E04B 1/78 |
| WO | 2017090686 A1 | 6/2017 | |
| WO | 2017147463 A1 | 8/2017 | |
| WO | 2018170772 A1 | 9/2018 | |
| WO | 2019241603 A1 | 12/2019 | |
| WO | WO-2020005965 A1 * | 1/2020 | ............ B32B 17/06 |
| WO | 2020084668 A1 | 4/2020 | |

(56) References Cited

FOREIGN PATENT DOCUMENTS

| WO | WO-2021129488 A1 * | 7/2021 |
| WO | 2021224228 A1 | 11/2021 |
| WO | 2022031536 A1 | 2/2022 |

OTHER PUBLICATIONS

Machine translation of CN 108060874 A, obtained from EspaceNet (Year: 2023).*
Machine translation of KR 101583005 B1.*
Machine translation of CN 108623194 A.*
Machine translation of 2008/047027 A1.*
Full English Translation of Chinese Publication No. 109989680 A, published Jul. 9, 2019, 36 pages.
Insight on Color, "Hunter L, a, b Color Scale," Applications Note, vol. 8, No. 9, Jun. 2008, 2008, 4 pages.
Buettner, "Investigation of Bacterial Cellulose as a Carbon Fiber Precurser and its Potential for Piezoelectric Energy Harvesting," Thesis, Cornell University, Aug. 2014, 90 pages.
Leitch et al., "Bacterial Nanocellulose Aerogel Membranes: Novel High-Porosity Materials for Membrane Distillation," Environmental Science and Technology Letters, vol. 3, 2016, pp. 8591.
Jia et al., "Preparation and characterization of a novel bacterial cellulose/chitosan bio-hydrogel," Nanomaterials and Nanotechnology, vol. 7, 2017, pp. 18.
Merli, F et al., "Acoustic measurements on monolithic aerogel samples and application of the selected solutions to standard window systems," Applied Acoustics, 142 (2018), 123-131, 9 pages.
Bhuiya, M.M.H. et al., "Preparation of Monolithic Silica Aerogel for Fenestration Applications: Scaling up, Reducing Cycle Time and Improving Performance," Ind. Chem. Res. (2016), 55, 6971-6981, 11 pages.
Jensen, K.I. et al., "Development of windows based on highly insulating aerogel glazings," Journal of Non-Crystalline Solids, 350 (2004) 351-357, 7 pages.
PCT International Search Report and Written Opinion dated Oct. 20, 2021 for related International Application No. PCT/US2021/043895, 11 pages.
Valachova, D. et al., "Using of Aerogel To Improve Thermal Insulating Properties of Windows," Civil and Environmental Engineering, vol. 14, Issue Jan. 2018, 2-11. 10 pages.
International Patent Application No. PCT/US2023/077387, International Search Report and Written Opinion mailed Jan. 15, 2024, 13 pages.
Strobach, E., "Optically Transparent, Thermally Insulating and Soundproofing (OTTIS) Aerogel for High-Efficiency Window Applications," Massachusetts Institute of Technology, Jan. 15, 2020, 119 pages.
Paakko et al., "Long and entangled native cellulose I nanofibers allow flexible aerogels and hierarchically porous templates for functionalities", Soft Matter, 2008, 4, Published Sep. 23, 2008, pp. 2492-2499.
Wilson, "Fascinating world of gas-fill windows", Brattleboro Reformer, Downloaded from www.reformer.com/local-news/fascinating-world-of-gas-fill-windows/article_55f4a3be-da2f-5ba8-8da8-d5b44209f040.html, Published Apr. 3, 2012, p. 3.

* cited by examiner

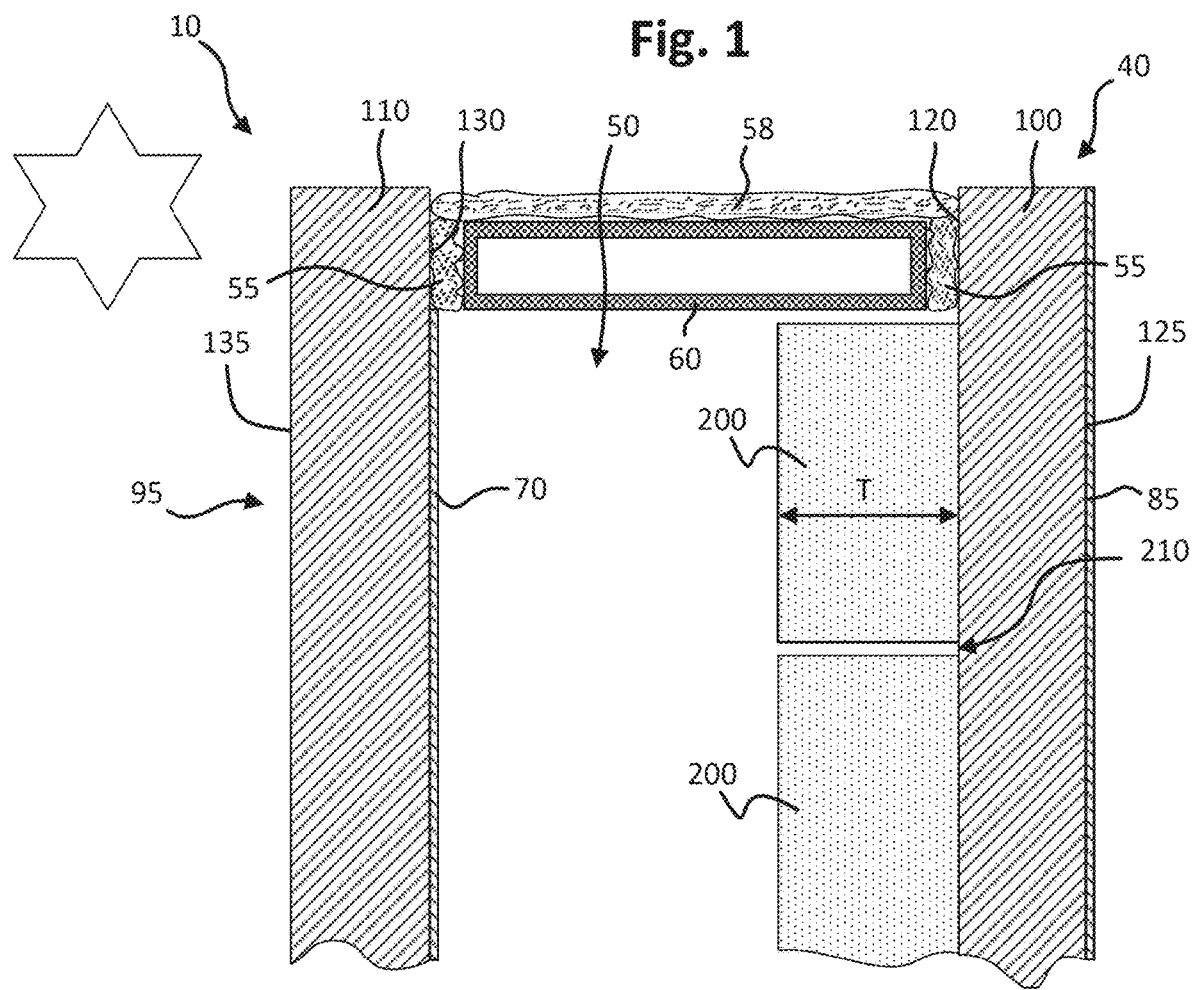

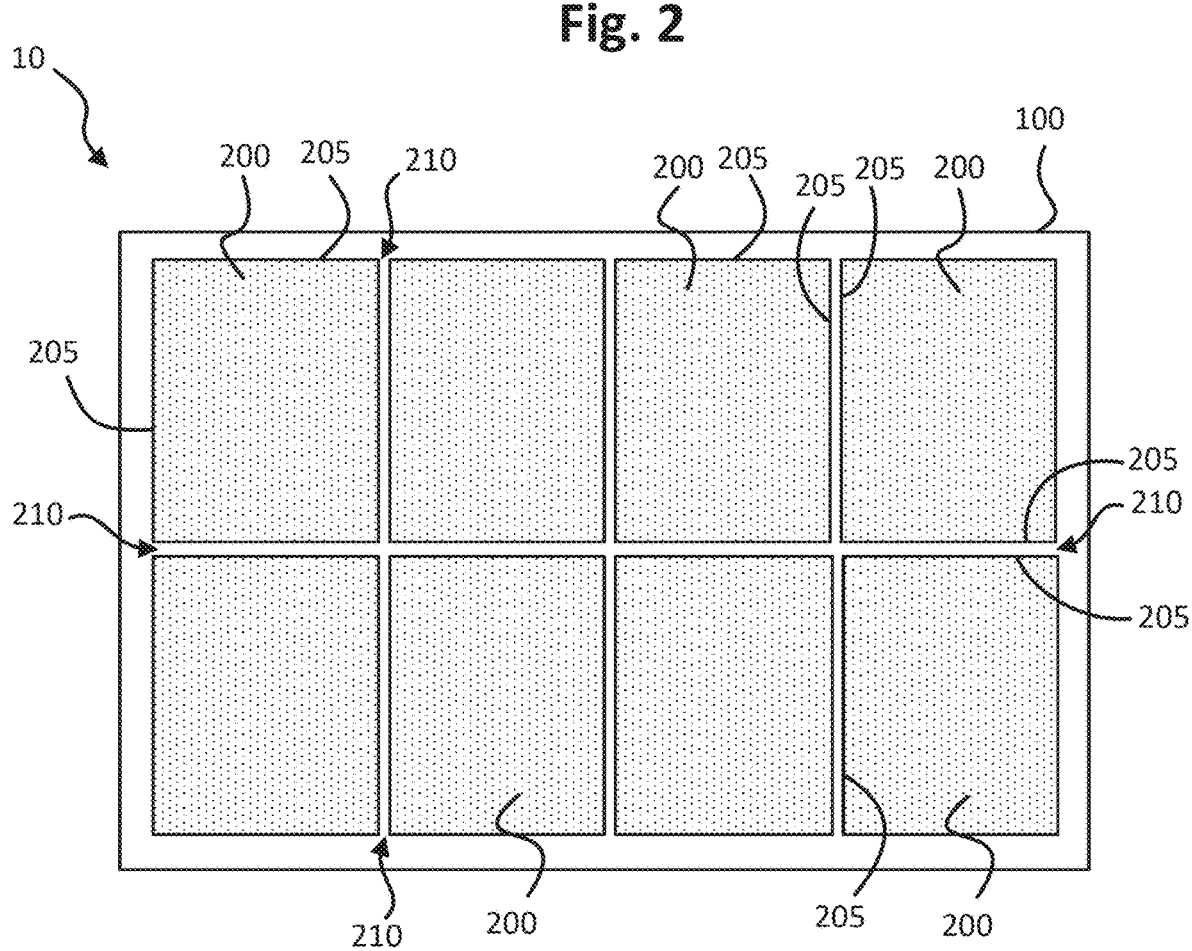

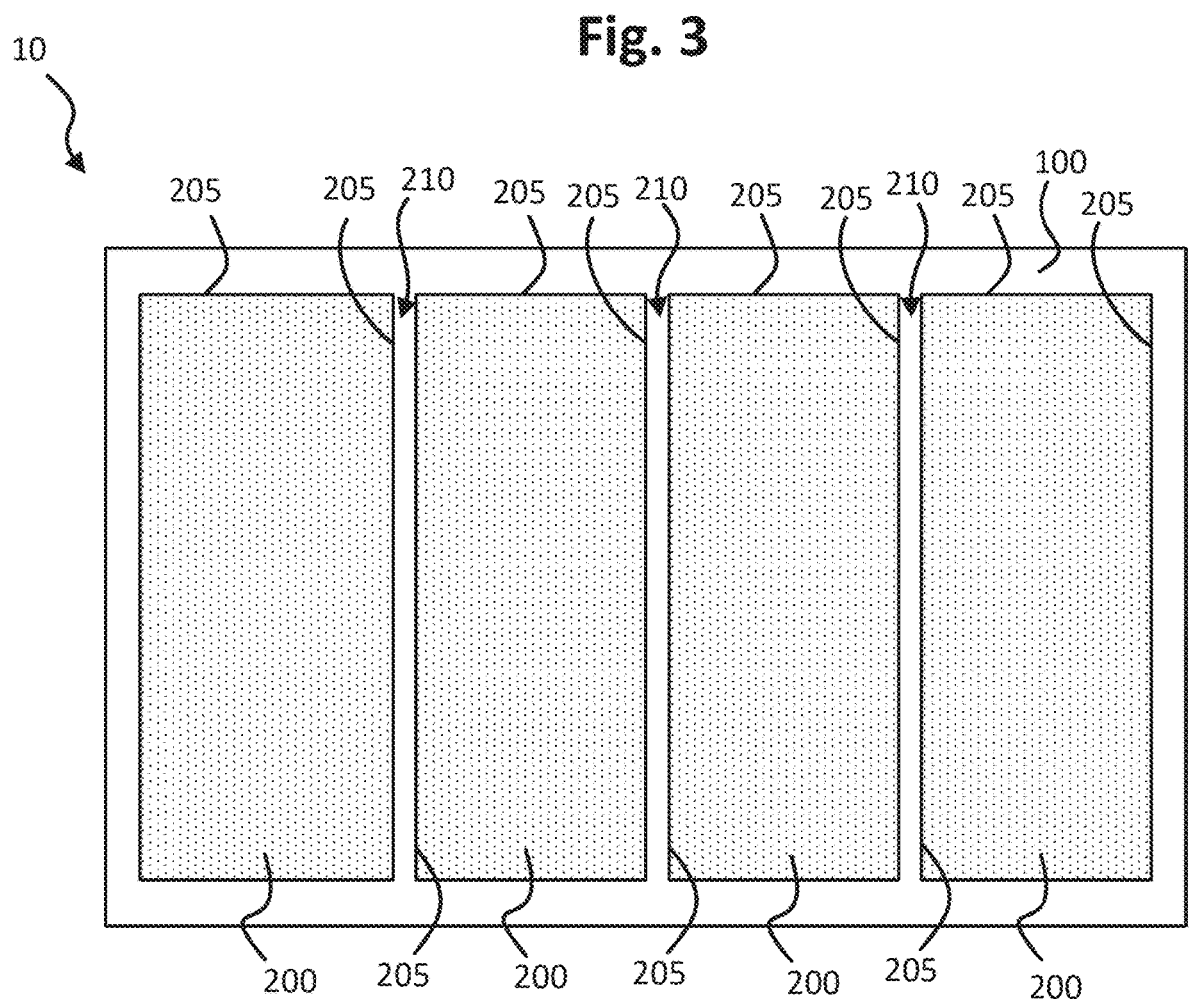

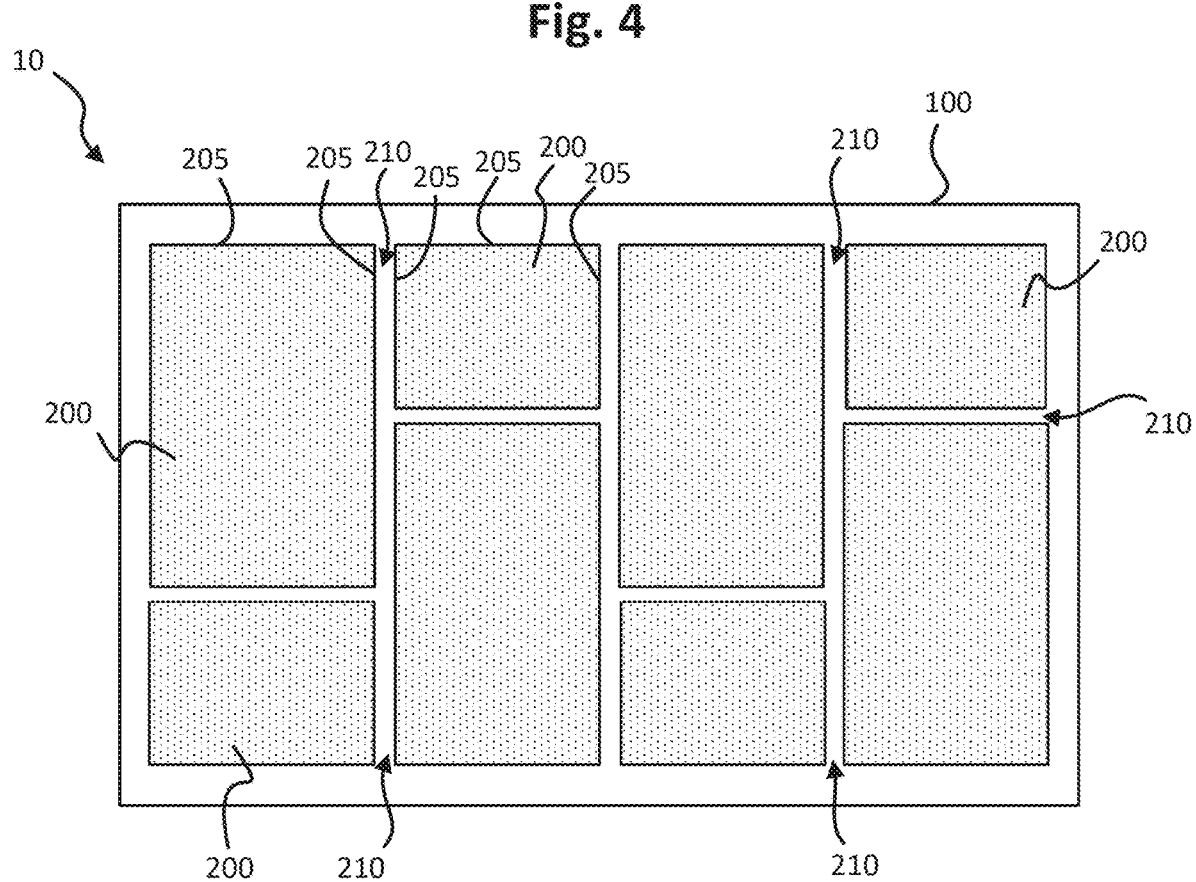

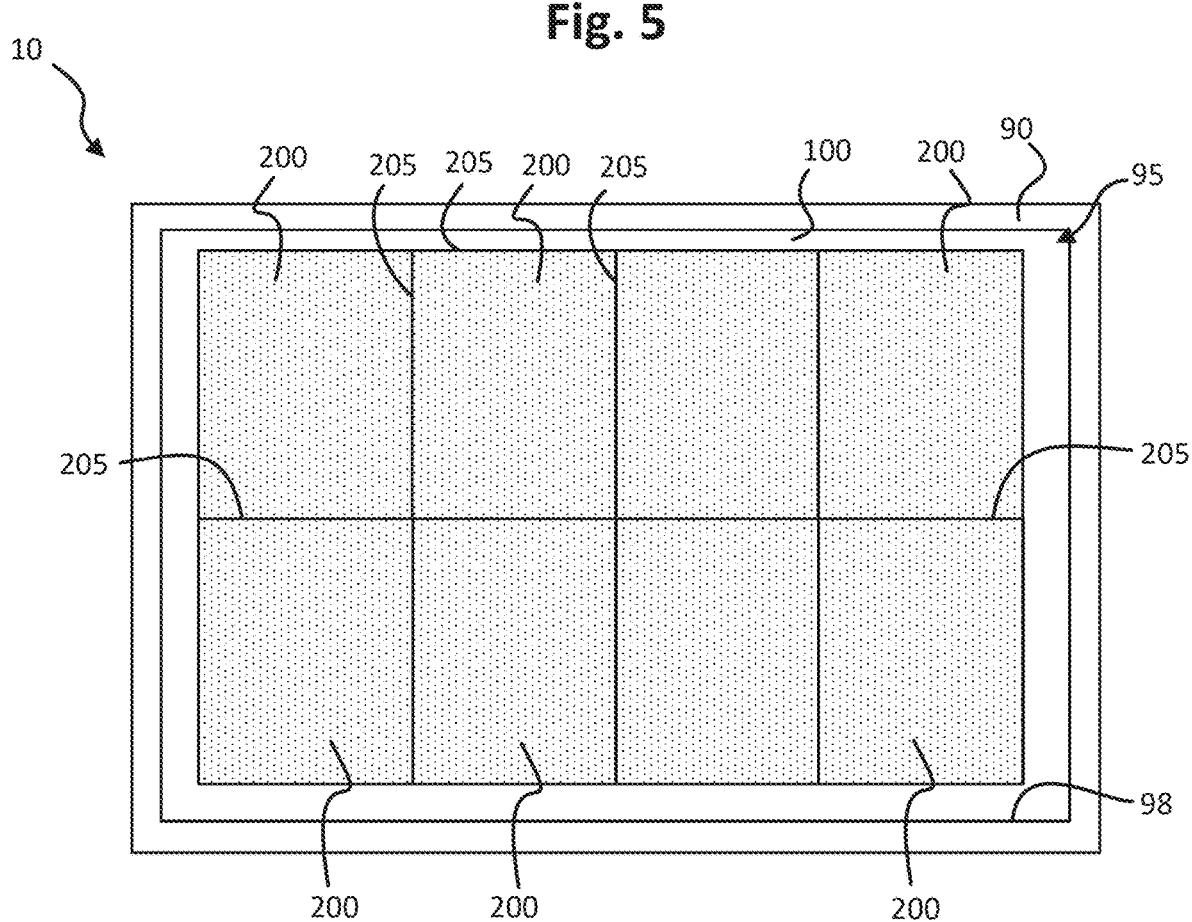

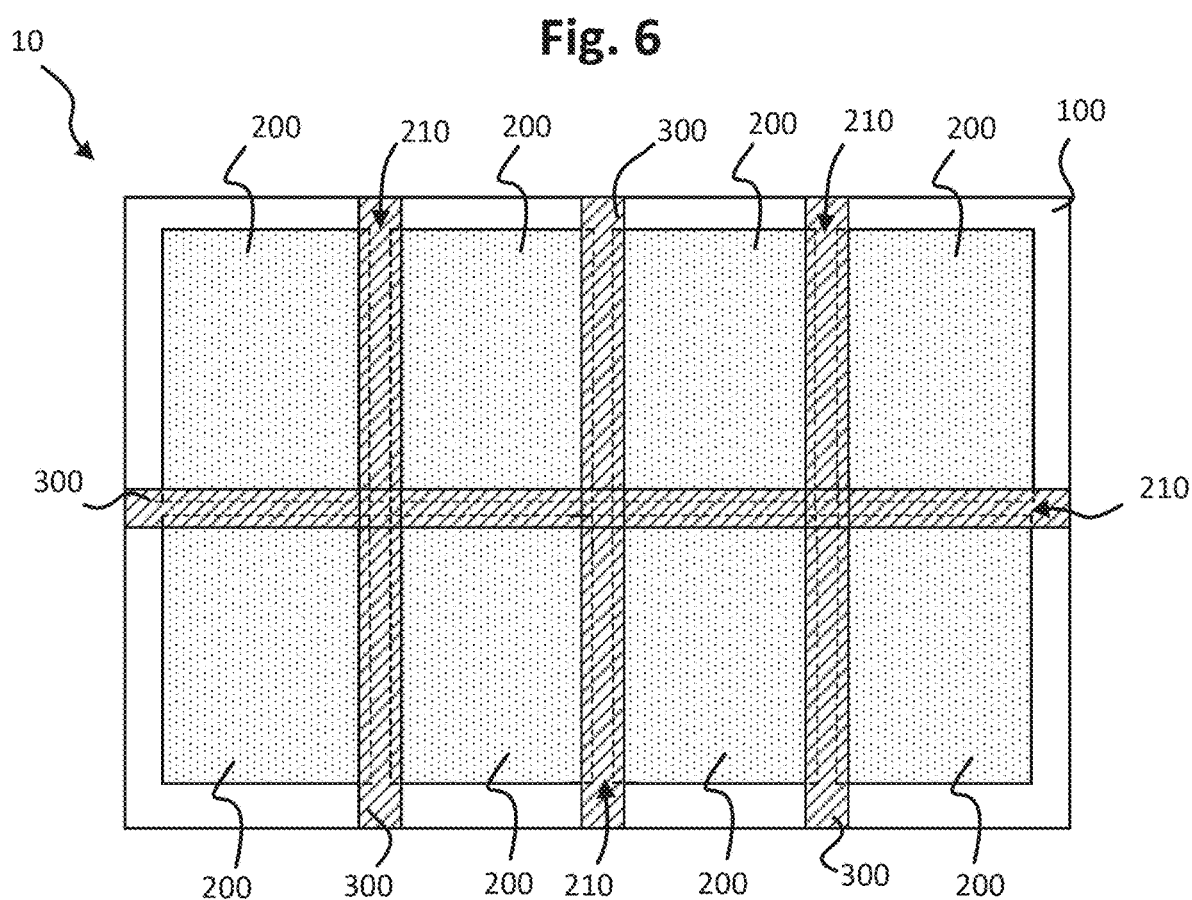

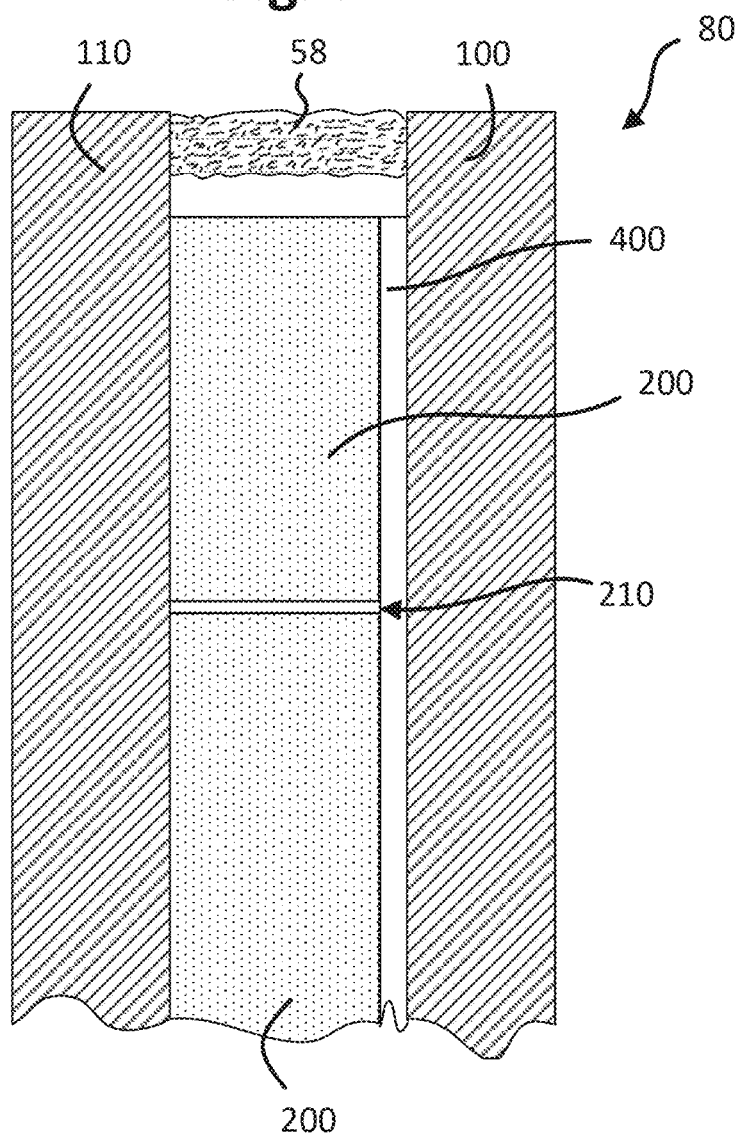

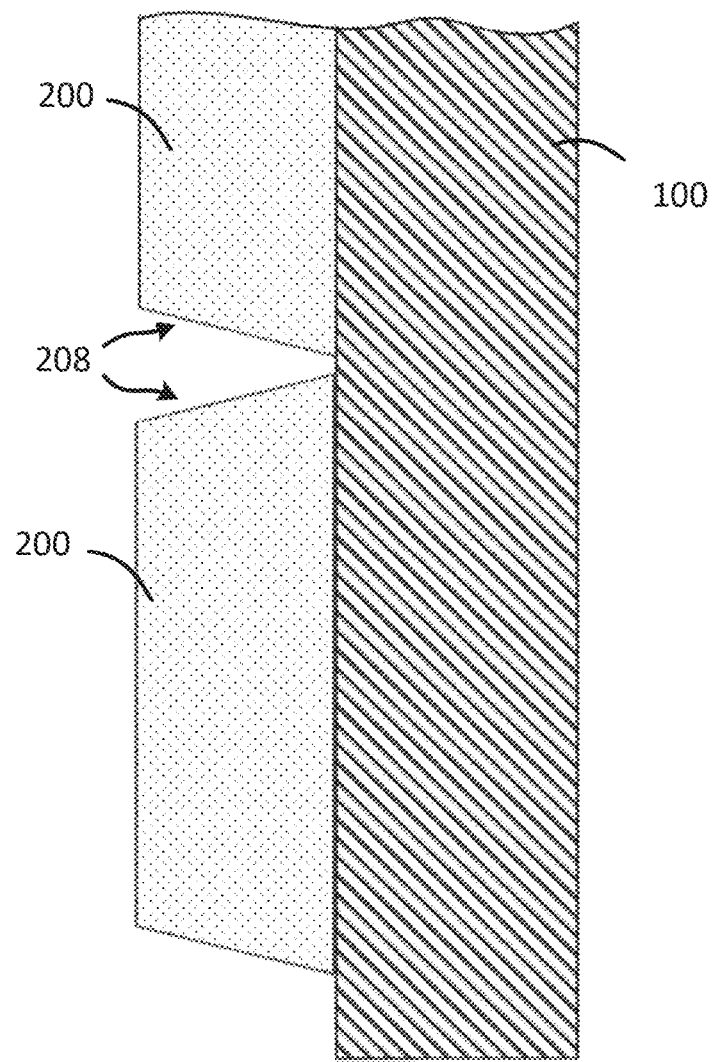

OPTICAL DEVICE WITH AEROGEL TILING TECHNOLOGY

RELATED APPLICATIONS

This application claims priority to U.S. Provisional Patent Application No. 63/062,910, filed Aug. 7, 2020, the contents of which are herein incorporated by reference.

FIELD OF THE INVENTION

The present invention relates to optical devices. More particularly, the present invention relates to optical devices having aerogel between two glass sheets.

BACKGROUND OF THE INVENTION

Aerogel is a known insulation material that can be used between two glass sheets. In some cases, aerogel is provided in granular, particulate form. When aerogel is prepared, it is conventionally dried in a high-pressure vessel. However, at larger sizes needed to scale the aerogel material, such chambers become prohibitively expensive and/or technically unfeasible.

It would be desirable to provide aerogel sheets arranged in a tiled configuration between two glass sheets. It would be particularly desirable to provide such a tiled arrangement where the aerogel sheets and the two glass sheets are part of a glass assembly unit, and the aerogel sheets cover a majority of the vision area of the glass assembly unit. In some embodiments, it would be desirable to provide a tiled arrangement where there is a gap between adjacently-positioned tiles, e.g., to decrease the likelihood of damaging the aerogel tiles. In such cases, it would be desirable to provide a gap size between adjacent aerogel sheets that is narrow enough to prevent convection currents. Furthermore, it would be desirable to provide the aerogel sheets with a low enough haze and a low enough index of refraction so that any such gaps are not visually apparent. In other embodiments, it would be desirable to conceal the gaps behind muntin bars, or to provide the gaps as part of a bird-safe pattern (i.e., so as to limit bird collisions with the glass). In still other embodiments, it would be desirable to arrange the aerogel sheets so as to be in edge-to-edge contact with each other.

BRIEF DESCRIPTION OF THE DRAWINGS

FIG. 1 is a schematic, broken-away, cross-sectional side view of an optical device in accordance with certain embodiments of the present invention;

FIG. 2 is a schematic front view of an optical device in accordance with certain embodiments of the invention;

FIG. 3 is a schematic front view of an optical device in accordance with other embodiments of the invention;

FIG. 4 is a schematic front view of an optical device in accordance with still other embodiments of the invention;

FIG. 5 is a schematic front view of a glass assembly unit mounted in a frame in accordance with yet other embodiments of the invention;

FIG. 6 is a schematic front view of an optical device comprising a plurality of muntin bars in accordance with certain embodiments of the invention;

FIG. 7 is a schematic, broken-away, cross-sectional side view of a laminated glass assembly in accordance with certain embodiments of the invention;

FIG. 8B is a schematic, broken-away, cross-sectional side view of a portion of an optical device in accordance with other embodiments of the invention, showing yet another arrangement of two adjacent aerogel sheets having tapered confronting edges.

SUMMARY OF THE INVENTION

Figure 8A:
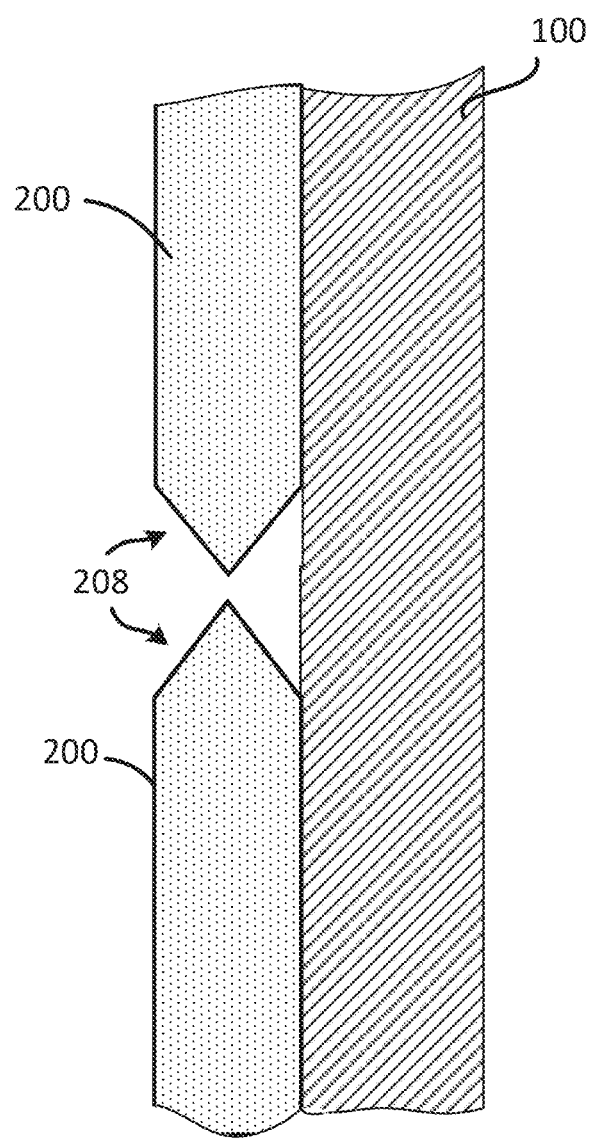
FIG. 8A is a schematic, broken-away, cross-sectional side view of a portion of an optical device in accordance with certain embodiments of the invention, showing the tapered confronting edges of two adjacent aerogel sheets.

Certain embodiments provide an optical device comprising a glass assembly unit. The glass assembly unit comprises two glass sheets and a plurality of aerogel sheets. The aerogel sheets are arranged in a tiled configuration between the two glass sheets so as to cover a majority of a unit area of the glass assembly unit. In some embodiments, the tiled configuration is characterized by each of the aerogel sheets being spaced from an adjacent one of the aerogel sheets by a gap distance of no greater than 5 mm. In other embodiments, the tiled configuration is characterized by each of the aerogel sheets being in edge-to-edge contact with an adjacent one of the aerogel sheets.

Some embodiments provide an optical device comprising a multiple-pane insulating glazing unit. The multiple-pane insulating glazing unit comprises two glass sheets and a between-pane space. The between-pane space is located between the two glass sheets. The multiple-pane insulating glazing unit further comprises a plurality of aerogel sheets arranged in a tiled configuration. The aerogel sheets are arranged in the tiled configuration inside the between-pane space and are adhered to an interior surface of a first one of the two glass sheets. The aerogel sheets are arranged so as to cover a majority of a unit area of the multiple-pane insulating glazing unit.

Certain other embodiments provide an optical device comprising a multiple-pane insulating glazing unit. The multiple-pane insulating glazing unit comprises two glass sheets and a between-pane space. The between-pane space is located between the two glass sheets. The multiple-pane insulating glazing unit further comprises a plurality of aerogel sheets arranged in a tiled configuration. The aerogel sheets are arranged in the tiled configuration inside the between-pane space and are adhered to an interior surface of a first one of the two glass sheets. The tiled configuration is characterized by each of the aerogel sheets being spaced from an adjacent one of the aerogel sheets by a gap. Each gap has a distance of no greater than 5 mm.

Still other embodiments provide an optical device comprising a multiple-pane insulating glazing unit. The multiple-pane insulating glazing unit comprises two glass sheets and a between-pane space. The between-pane space is located between the two glass sheets. The multiple-pane insulating glazing unit further comprises a plurality of aerogel sheets arranged in a tiled configuration. The aerogel sheets are arranged in the tiled configuration inside the between-pane space and are adhered to an interior surface of a first one of the two glass sheets. The tiled configuration is characterized by each of the aerogel sheets being in edge-to-edge contact with an adjacent one of the aerogel sheets.

Certain other embodiments provide an optical device comprising a laminated glass assembly. The laminated glass assembly comprises two glass sheets and a plurality of aerogel sheets. The aerogel sheets are arranged in a tiled configuration between the two glass sheets. The aerogel sheets are arranged so as to cover a majority of a unit area of the laminated glass assembly. In some embodiments, the tiled configuration is characterized by each aerogel sheet being spaced from an adjacent one of the aerogel sheets by a gap distance of no greater than 5 mm. In other embodiments, the tiled configuration is characterized by each aerogel sheet being in edge-to-edge contact with an adjacent one of the aerogel sheets.

In certain embodiments, the invention provides an IG unit or a laminated glass panel having one or more aerogel sheets located between two glass sheets. In the present embodiments, the one or more aerogel sheets are positioned such that when the IG unit or laminated glass panel is mounted in a frame, perimeter edges of the aerogel sheet(s) are outside a vision area. In the present embodiments, there may be only a single aerogel sheet, rather than a plurality of aerogel sheets arranged in a tiled configuration. However, the aerogel in the present embodiments can also be provided in the form of multiple aerogel sheets in a tiled configuration. There can optionally be a spacer and/or an edge sealant bead from which the perimeter edges of the aerogel sheet(s) are separated.

DETAILED DESCRIPTION OF PREFERRED EMBODIMENTS

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

Referring to the drawings, and starting with FIG. 1, there is shown an optical device of the present disclosure generally represented by reference numeral 10. The optical device 10 comprises a glass assembly unit that includes a first glass sheet 100, a second glass sheet 110, and a plurality of aerogel sheets 200. The plurality of aerogel sheets 200 are arranged between the first 100 and second 110 glass sheets. FIG. 1 shows an embodiment where the glass assembly unit comprises (e.g., is) a multiple-pane insulating glazing unit 40. This, however, is not required in all embodiments. For example, in other cases, the glass assembly unit comprises (e.g., is) a laminated glass assembly 80 (FIG. 7). More will be said of this later.

A variety of known glass types can be used for the first 100 and second glass sheets 110, including soda-lime glass or borosilicate glass. In some cases, it may be desirable to use "white glass," a low iron glass, etc. In certain embodiments, the glass sheets are part of a window, door, skylight, or other glazing.

Glass sheets of various sizes can be used in the present invention. Commonly, large-area glass sheets are used. Certain embodiments involve first and second glass sheets each having a major dimension (e.g., a length or width) of at least about 0.5 meter, preferably at least about 1 meter, perhaps more preferably at least about 1.5 meters (e.g., between about 2 meters and about 4 meters), and in some cases at least about 3 meters. In some embodiments, each glass sheet is a jumbo glass sheet having a length and/or width that is between about 3 meters and about 10 meters, e.g., a glass sheet having a width of about 3.5 meters and a length of about 6.5 meters.

Glass sheets of various thicknesses can be used in the present invention. In some embodiments, each glass sheet has a thickness of about 1-8 mm. Certain embodiments involve glass sheets with a thickness of between about 2.3 mm and about 4.8 mm, and perhaps more preferably between about 2.5 mm and about 4.8 mm. In one particular embodiment, glass panes (e.g., soda-lime glass) with a thickness of about 3 mm are used.

The first glass sheet 100 has opposed surfaces 120, 125, which preferably are opposed major surfaces (or "opposed faces"). Similarly, the second glass sheet 110 has opposed surfaces 130, 135, which preferably are opposed major surfaces. In some cases, as shown in FIG. 1, surfaces 120 and 130 are interior surfaces facing a between-pane space 50, while surfaces 125 and 135 are exterior surfaces, e.g., such that surface 135 is an exterior surface exposed to an outdoor environment (and thus exposed to periodic contact with rain). This, however, is not required.

As used herein, the term "aerogel" refers to a material that is obtained by combining either a nonfluid colloidal network or a polymer network with liquid so as to form a gel, and then removing the liquid from the gel and replacing the liquid with a gas or vacuum. As discussed in greater detail below, the resulting aerogel (and particularly the preferred aerogel described herein) has a very low density and provides excellent insulating properties.

The aerogel 200 of the present disclosure can comprise (e.g., can be) either a silica-based aerogel or a polymer-based aerogel. However, due to the commonly more fragile nature of silica-based aerogels, the aerogel 200 of the present invention preferably is a polymer-based aerogel. In some cases, the aerogel is a cellulose-based aerogel. Aerogels of this nature are described in International PCT Patent Application No. PCT/US2019/037122, the teachings of which are incorporated herein by reference. The aerogel can contain cellulosic nanocomposites that are aligned in ordered liquid crystal phases.

In the present invention, the aerogel preferably is provided in the form of sheets. This is in contrast to aerogel in flowable granular or otherwise particulate form. The aerogel sheets preferably are self-supporting, i.e., once fully synthesized and formed, the sheets can retain their sheet form without being adhered to glass or another support. It is to be appreciated, however, that once incorporated into the insulating glazing unit, the aerogel sheets preferably are supported by one of the glass panes 100, 110. As illustrated, there preferably is no cell or honeycomb structure surrounding/containing particulate aerogel.

The aerogel sheets 200 are arranged in a tiled configuration between the two glass sheets 100, 110. The plurality of aerogel sheets 200 preferably are collectively arranged (optionally in a non-overlapping manner) so as to cover a majority (i.e., greater than 50%) of the unit area of the glass assembly unit. In some embodiments, the aerogel sheets 200 are arranged in the tiled configuration so as to cover more than 60% (e.g., more than 70%, more than 80%, or even more than 90%) of the unit area of the glass assembly unit. The term "unit area" is used herein to refer to the total area of the pane surface (e.g., surface 120) that the aerogel sheets 200 are carried alongside.

The aerogel sheets 200 can have any desired shape and tiling arrangement. As non-limiting examples, the aerogel sheets 200 can be square, rectangular, or hexagonal in shape. In some embodiments, edges 205 of each aerogel sheet 200 are aligned both vertically and horizontally with edges 205 of adjacently-positioned aerogel sheets 200 (see, e.g., FIG. 2). In certain embodiments, the aerogel sheets 200 are rectangular strips that extend the entire, or substantially the entire, height or width of the glass assembly unit (see FIG. 3). In other embodiments, at least some of the aerogel sheets 200 have shapes different from some of the other aerogel sheets 200 (see FIG. 4). While certain exemplary tiling configurations are shown in FIGS. 2-5, many other tiling configurations can be used.

In addition, the size of the aerogel sheets 200 is not particularly limited. In some embodiments, all of the aerogel sheets 200 have the same dimensions (see, e.g., FIG. 2). In other embodiments, as shown in the non-limiting example of FIG. 4, some of the aerogel sheets 200 have different dimensions (e.g., a greater length) compared to some of the other aerogel sheets 200.

Preferably, each of the aerogel sheets 200 has a length and a width of at least 10 cm. For each of the aerogel sheets 200, the length, the width, or both are preferably less than 1 meter. Such dimensions allow the aerogel sheets 200 to be scaled-up so as to cover large areas between two glass panes 100, 110 of a glass assembly unit, while still allowing the aerogel sheets 200 to be dried using a conventional high-pressure vessel. Skilled artisans will appreciate that larger or smaller aerogel sheets 200 may alternatively be used, depending on the aerogel production process and equipment used, as well as the size and configuration of the desired units.

The optical device 10 shown in FIG. 1 is an insulating glazing unit ("IG" unit) 40. The IG unit 40 comprises the two glass sheets 100, 110, the plurality of aerogel sheets 200, and a between-pane space 50 located between the two glass sheets 100, 110. The aerogel sheets 200 are arranged in the tiled configuration inside the between-pane space 50 and are adhered to an interior surface 120 of the first glass sheet 100. By saying the aerogel sheets 200 are "adhered to" a surface of a glass sheet, this does not require any separate adhesive. It also does not require the aerogel to contact the glass; there may be a coating or layer therebetween. Thus, although "adhered to" may involve direct contact, the broader meaning as used herein is "carried alongside." This can optionally mean the aerogel is supported by the glass surface, and in some preferred embodiments the aerogel does contact the glass surface. In some embodiments, there is at most one layer (e.g., an optical adhesive layer) between the aerogel sheets 200 and the glass.

In certain embodiments, the between-pane space 50 is filled with a thermally-insulative gas mix, such as a mix of 90% argon and 10% air. This, however, is not required. For example, the IG unit 40 may alternatively be filled with a desired single gas or air.

In some embodiments, the second glass sheet 110 is an outboard pane that defines both a #1 surface (i.e., surface 135) and a #2 surface (i.e., surface 130), while the first glass sheet 100 is an inboard pane that defines both a #3 surface (i.e., surface 120) and a #4 surface (i.e., surface 125). The IG unit 40 can optionally be mounted in a frame 90 (as shown in FIG. 5), e.g., such that the #1 surface is exposed to an outdoor environment, while the #4 surface is exposed to an indoor environment.

The aerogel sheets 200 can be adhered to either the #2 surface or the #3 surface of the IG unit 40. Another option is to have aerogel sheets on both the #2 and the #3 surfaces. While FIG. 1 shows a double-pane IG unit, other embodiments provide a triple-pane IG unit having the aerogel sheets 200 on either the #2 surface, the #3 surface, the #4 surface, or the #5 surface. In triple-pane embodiments, aerogel sheets can optionally be provided on both the #3 surface and either the #4 or #5 surface. Another option is to provide aerogel sheets on both the #2 surface (e.g., for applications where a low-emissivity or solar control coating is on the #3 surface) and the #4 or #5 surface.

In some embodiments, the IG unit 40 also includes a low-emissivity coating 70. In the embodiment of FIG. 1, the #2 surface bears the low-emissivity coating 70. In embodiments of this nature, the aerogel sheets 200 can be adhered to the #3 surface (i.e., surface 120) and can be spaced from the low-emissivity coating 70. Alternatively, the aerogel can be on the #2 surface while a low-emissivity or solar control coating is on the #3 surface. In certain preferred embodiments, the aerogel sheets 200 are spaced from the low-emissivity coating 70 by at least 2 mm but not more than 15 mm (e.g., by 4-15 mm, 5-12 mm, or 10-15 mm).

When provided, the low-emissivity coating 70 preferably includes at least one silver-inclusive film, which desirably contains more than 50% silver by weight (e.g., a metallic silver film). In certain preferred embodiments, the low-emissivity coating 70 includes three or more infrared-reflective films (e.g., silver-containing films). Low-emissivity coatings having three or more infrared-reflective films are described in U.S. patent and application Ser. No. 11/546,152 and U.S. Pat. Nos. 7,572,511 and 7,572,510 and 7,572,509 and U.S. Ser. No. 11/545,211 and U.S. Pat. Nos. 7,342,716 and 7,339,728, the teachings of each of which are incorporated herein by reference. In some cases, the low-emissivity coating 70 includes four silver layers. In other cases, the low-emissivity coating can be a "single silver" or "double silver" low-emissivity coating, which are well-known to skilled artisans. Advantageous coatings of this nature are commercially available from, for example, Cardinal CG Company (Eden Prairie, Minnesota, U.S.A.).

The double-pane IG unit 40 can optionally further include a transparent conductive oxide (TCO) coating 85 on an exterior surface of one of the two glass panes 100, 110. This can optionally be the case for any embodiment of the present disclosure. In such cases, the aerogel sheets 200 and the TCO coating 85 are both supported by (e.g., are on opposite surfaces of) the first one of the two glass panes 100, 110. In such embodiments, the U factor (for a double-pane IG unit 40) preferably is in a range of from 0.11 to 0.19 Btu/(h·ft$^2$·°F.). More generally, a transparent conductive oxide coating 85 (e.g., on surface 125) can optionally be provided for any embodiment of the present disclosure.

When provided, the transparent conductive oxide coating 85 may comprise, consist essentially of, or consist of indium tin oxide ("ITO"). In alternate embodiments, zinc aluminum oxide, SnO:Sb, sputtered SnO:F, or another known TCO is used. Thus, in certain embodiments, the transparent conductive oxide coating 85 comprises (e.g., is) a sputtered film that includes tin (e.g., comprising tin oxide together with antimony, fluorine, or another dopant). In some cases, the TCO film (which either forms or is part of the transparent conductive oxide coating 85) includes carbon nanotubes. Preferably, the TCO film (which optionally comprises ITO) is provided at a thickness of 10,000 Å or less, such as between about 1,000 Å and about 7,000 Å, e.g., from 1,000 Å to 1,750 Å, such as about 1,300-1,600 Å. For any embodiment where the transparent conductive oxide coating 85 is provided, it can optionally comprise a TCO (e.g., ITO) film having a thickness of from 1,000 Å to 1,750 Å.

The transparent conductive oxide coating 85 can, for example, be a coating of the type described in any of U.S. Pat. No. 9,862,640 or U.S. Pat. No. 10,000,965 or U.S. Pat.

No. 10,000,411 or U.S. Ser. No. 16/740,006, the teachings of which concerning the transparent conductive oxide coating are hereby incorporated herein by reference.

Thus, in some cases, the insulating glazing unit 40 includes both a transparent conductive oxide coating 85 and a low-emissivity coating 70. This, however, is not required in all embodiments. For example, in some cases, the insulating glazing unit 40 includes the low-emissivity coating 70 but is devoid of the transparent conductive oxide coating 85.

Certain embodiments include a spacer 60 between the two glass sheets 100, 110. The spacer 60 can be adhered to the two glass sheets 100, 110 by one or more beads of sealant 55, 58 as is conventional and well-known to skilled artisans. The spacer 60 may be a conventional metal channel spacer, e.g., formed of stainless steel or aluminum. Or, it can comprise polymer and metal, or just polymer (e.g., foam). The spacer can alternatively be an integral part of a sash, frame, etc. so as to maintain the IG unit in the desired configuration. In some embodiments, the aerogel sheets 200 do not contact the spacer 60. For example, the aerogel sheets 200 (or at least the aerogel sheets adjacent the spacer) may be separated (i.e., spaced-apart) from the spacer 60 by about 1 mm to about 5 mm (e.g., about 2-4 mm, such as about 3 mm). When provided, the sealant 55, 58 between the spacer 60 and the two adjacent glass sheets 100, 110 can also be spaced from the aerogel 200.

In FIG. 1, the spacer 60 is shown with a primary sealant 55 (e.g., comprising two beads of sealant on opposite sides of the spacer) and a secondary sealant 58. Another option is to omit the secondary sealant. Or, a single deposit of sealant can be provided along both sides of the spacer and on the outside wall of the spacer. Various other known sealant arrangements/systems can alternatively be used. In FIG. 1, the primary sealant 55 is closest to (but spaced from) the aerogel sheets 200.

In other cases, the spacer may be omitted while one or more beads of sealant (optionally together with a moisture vapor barrier) are provided about the perimeter of the unit so as to encompass the aerogel sheets 200. In some cases of this nature, the aerogel sheets 200 themselves assist in holding the glass sheets 100, 110 apart by the desired distance. In such cases, there may be no gas gap alongside the aerogel sheets 200.

The multiple-pane insulating glazing unit 40 has a vision area 95. As used herein, the term "vision area" refers to the area of the IG unit 40 through which a person is able to see once the IG unit is mounted operably in a frame. In FIG. 5, for example, the vision area 95 of the IG unit 40 is shown. In embodiments where the IG unit 40 is mounted in a frame 90, the frame 90 may delineate the vision area 95 (e.g., such that the vision area 95 is an area inward from an interior edge 98 of the frame 90). The perimeter edges of the aerogel sheets 200 can optionally be located outside of the vision area 95 (e.g., so as to be positioned at locations that will be concealed from view by a frame 90). While that is not the case in FIG. 5, advantageous embodiments having such arrangements are discussed below in more detail with reference to FIG. 9.

In any embodiment of the present disclosure, the aerogel sheets 200 may be arranged so as to cover a majority (i.e., greater than 50%) of the vision area 95. In some embodiments, the aerogel sheets 200 cover at least 60%, at least 70%, or at least 80% of the vision area 95 of the IG unit 40. In certain embodiments, the aerogel sheets 200 cover an entirety of the vision area 95.

With reference to the frame 90 that is shown in FIG. 5, or otherwise referenced in the present disclosure, it is to be appreciated that this frame may be a sash or part of a sash (e.g., an exterior weather strip and/or glazing bead). Further, the vision area described above is determined when looking straight at the adjacent pane surface from a vantage point aligned with an outermost perimeter portion of the vision area. Moreover, to the extent an outboard portion of the frame projects further inwardly than does an inboard portion of the frame (or vice versa), the vision area is to be considered that area that is inward of the frame portion that projects furthest inwardly. This can be appreciated by referring to FIG. 9. In some cases, that frame portion may be an exterior sash portion comprising vinyl or another polymer.

Figure 9:
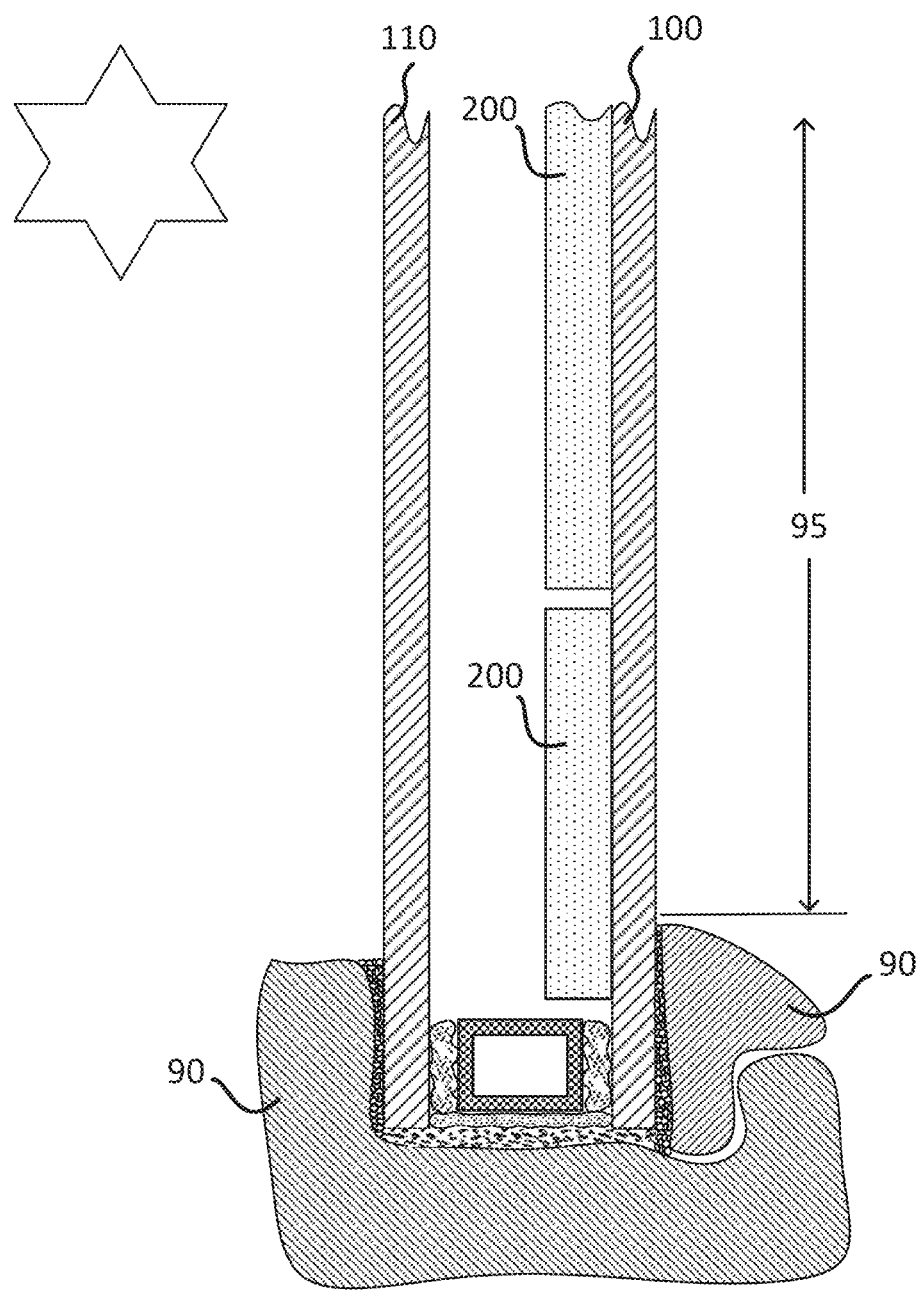
FIG. 9 is a schematic, broken-away, cross-sectional side view of an insulating glazing unit mounted in a frame in accordance with certain embodiments of the invention, with outermost edges of the aerogel sheets positioned outside the vision area.

Thus, in some embodiments, a plurality of aerogel sheets 200 are arranged on an IG unit 40 so as to have outermost edges positioned such that those edges will be outside the vision area 95 when the IG unit 40 is mounted operably in a frame 90, such as a sash. This can optionally be the case for any embodiment of the present disclosure (including the laminated glass embodiments). In some embodiments of this nature, a plurality of gaps 210 between adjacent aerogel sheets 200 are located within the vision area 95. Additionally or alternatively, the IG unit 40 may include a spacer 60 and the outermost edges of a plurality of the aerogel sheets 200 can optionally be spaced from the spacer 60, e.g., by the separation distances noted above. While FIG. 9 shows the aerogel in the form of multiple spaced-apart sheets, it can alternatively have just a large single aerogel sheet with its perimeter edges positioned so as to be outside the vision area when the IG unit 40 is mounted in a frame 90. Furthermore, in such embodiments, the aerogel sheet(s) can optionally have any of the dimensions, properties, or both described elsewhere in this disclosure.

As discussed above, the aerogel sheets 200 are adhered to an interior surface (e.g., the #3 surface) of the first glass sheet 100. In some embodiments, the aerogel sheets 200 adhere to the glass surface through van der Waals forces. In other embodiments, the aerogel sheets 200 are adhered to the first glass sheet 100 by an optical adhesive, optionally such that portions of the aerogel sheets 200 are devoid of the optical adhesive. In embodiments of this nature, the optical adhesive can be located at a perimeter of each aerogel sheet 200.

In some embodiments, the tiled configuration is characterized by each of the aerogel sheets 200 being spaced from an adjacent one of the aerogel sheets 200 by a gap 210. Advantageously, this spacing arrangement may help ensure that the aerogel sheets 200 will not become damaged. Moreover, the gaps 210 are narrow enough to prevent or minimize convection between the aerogel sheets 200. In many embodiments, the gap distance will be no greater than 5 mm. The distance of each gap 210 preferably is in a range of from 20 µm to 2 mm (e.g., from 40 µm to 1.5 mm, or from 60 µm to 1.0 mm). Each gap 210 preferably contains only gas.

In certain embodiments that include gaps 210 between aerogel sheets 200, the edges 205 of the aerogel sheets 200 are shaped so as to reduce the sharpness of the contrast and/or transition between the aerogel sheets 200 and the surrounding gap 210. For example, in some embodiments, each aerogel sheet 200 has a tapered edge configuration, such that each adjacent pair of the aerogel sheets 200 has confronting tapered edges 208. Reference is made to FIGS. 8A and 8B, which depict two non-limiting examples. The taper can be made by cutting a bevel into the edge 205 of the aerogel sheet 200 (e.g., using a knife, sander, or laser), or by using a shaped mold edge when drying the aerogel. Skilled artisans will appreciate that confronting tapered edges 208 are not required and may be omitted in certain embodiments.

In certain embodiments, the optical device 10 comprises a plurality of muntin bars 300, as shown in FIG. 6. In embodiments of this nature, each gap 210 can optionally be aligned with one of the muntin bars 300 so as to conceal the gaps 210 from view. Although the muntin bars 300 in FIG. 6 are shown together with aerogel sheets 200 having a particular tiling configuration, skilled artisans will appreciate that muntin bars 300 can be used to conceal the gaps 210 of various different tiling configurations. Moreover, the optical device 10 may include one or more muntin bars that conceal one or more gaps, and one or more muntin bars that do not conceal any gaps.

In certain other embodiments, each gap 210 is arranged as part of a gap pattern that deters bird collisions. Birds sometimes fly into windows and other glazings on high-rise buildings, residential buildings, and other structures. The present embodiment is concerned with creating a gap pattern that results in a glass product that birds can see more easily and avoid. In such embodiments, the gaps 210 between adjacent aerogel sheets 200 are formed into a pattern (e.g., stripes or a grid) specifically designed to deter bird collisions.

In further embodiments, the tiled configuration is characterized by each of the aerogel sheets 200 being in edge-to-edge contact with an adjacent one (or a plurality of adjacent ones) of the aerogel sheets 200. Such a tiling configuration is shown in the non-limiting embodiment of FIG. 5. In certain embodiments where the aerogel sheets 200 are arranged in edge-to-edge contact with one another, the aerogel sheets 200 are optionally arranged so as to cover an entirety of the vision area 95.

The between-pane space 50 has a thickness, which is measured from the interior surface 130 of the second glass pane 110 to the interior surface 120 of the first glass pane 100. In certain embodiments, the aerogel sheets 200 do not occupy the entire thickness of the between-pane space 50, such that there is a gas gap alongside the aerogel sheets 200 within the between-pane space 50. One example of such a configuration is shown in FIG. 1.

The aerogel sheets 200 have a thickness T. In some embodiments, the aerogel sheets 200 have a thickness in a range of from 1.5 mm to 15 mm, such as greater than 2 mm but less than 8 mm, or from 2 mm to 4 mm (e.g., 3 mm). It is to be appreciated, however, that other thicknesses can be used in certain embodiments.

A ratio of the thickness T of the aerogel sheets 200 to the thickness of the between-pane space 50 preferably is between 0.15 and 0.85. In some embodiments, the thickness of the between-pane space 50 is at least 10 mm, optionally together with the thickness of the aerogel sheets 200 being greater than 2 mm but less than 8 mm. In certain preferred embodiments, the aerogel sheets 200 occupy less than 50% of the thickness of the between-pane space 50 (e.g., less than 45%, less than 40%, or even less than 35% of the thickness of the between-pane space 50).

In other embodiments, the aerogel sheets 200 occupy a majority of the thickness of the between-pane space 50. In such instances, the thickness T of each aerogel sheet 200 preferably is greater than 8 mm but less than 15 mm (e.g., about 10 mm), while the thickness of the gas gap alongside the aerogel sheets 200 is optionally less than 5 mm (e.g., about 3 mm).

Each aerogel sheet 200 preferably has an index of refraction of less than 1.1 (such as between 1.0 and 1.1, or more preferably between 1.0 and 1.04). This index of refraction (at 550 nm) can optionally be provided in combination with each aerogel sheet 200 having a thickness in a range of from 1.5 mm to 15 mm (such as a thickness of greater than 2 mm but less than 8 mm). It is to be appreciated, however, that the index of refraction values noted in this paragraph are optional, and a higher index of refraction may be provided in certain embodiments.

Each aerogel sheet 200 preferably is formed of materials, and made by a process, that allows the aerogel sheets 200 to have a haze of less than 4% (e.g., less than 3%, less than 2%, or even less than 1%). This haze level can optionally be provided in combination with each aerogel sheet 200 having an index of refraction of less than 1.1 (including any of the particular ranges noted in the preceding paragraph). It is to be appreciated, however, that this haze level is optional. For example, higher haze levels may be suitable depending on the intended application.

Haze can be measured in well-known fashion, e.g., using a BYK Haze-Gard plus instrument. Reference is made to ASTM D 1003-00: Standard Test method for Haze and Luminous Transmittance of Transparent Plastics, the contents of which are incorporated herein by reference.

The aerogel sheets 200 preferably have a visible transmittance of greater than 90%. Thus, for any embodiment of the present disclosure, the visible transmittance of each aerogel sheet 200 can optionally be greater than 90%. In certain preferred embodiments, the visible transmittance is greater than 92%, greater than 95%, or even up to 97%, for each aerogel sheet 200.

The term "visible transmittance" is well known in the art and is used herein in accordance with its well-known meaning to refer to the percentage of all incident visible radiation that is transmitted through an object (e.g., through the aerogel sheet 200). Visible radiation constitutes the wavelength range of between about 380 nm and about 780 nm. Visible transmittance, as well as visible reflectance, can be determined in accordance with NFRC 300-2017, Standard Test Method for Determining the Solar and Infrared Optical Properties of Glazing Materials and Fading Resistance of Systems. The well-known LBNL WINDOW 7.4 computer program can be used in calculating these and other reported optical properties.

Each aerogel sheet 200 preferably exhibits a transmitted color characterized by "a" and "b" color coordinates that are each between −2 and 2. The present discussion of color properties is reported using the well-known color coordinates of "a" and "b." In more detail, the color coordinates are indicated herein using the subscript h (i.e., $a_h$ and $b_h$) to represent the conventional use of the well-known Hunter Lab Color System (Hunter methods/units, Ill. D65, 10 degree observer). The present color properties can be calculated as specified in "Insight on Color," "Hunter L, a, b Color Scale," Applications Note, Vol. 8, No. 9, 06/08 (2008), the relevant teachings of which are incorporated herein by reference.

In addition, each aerogel sheet 200 has a low density. In certain embodiments, each aerogel sheet 200 has a density of less than 250 kg/m$^3$. In some embodiments, each aerogel sheet 200 has a density of less than 235 kg/m$^3$, such as less than 220 kg/m$^3$, or even less than 200 kg/m$^3$.

The aerogel sheets 200 also have a low thermal conductivity. In some embodiments, each aerogel sheet 200 has a thermal conductivity at atmospheric pressure of less than 0.015 W/(m·K) but greater than or equal to 0.006 W/(m·K). In certain embodiments, each aerogel sheet 200 has a thermal conductivity at atmospheric pressure of less than 0.03 W/(m·K) but greater than or equal to 0.006 W/(m·K).

Preferably, each aerogel sheet 200 has an R value of between 0.9 and 3.8 ft$^2 \cdot °$F·h/BTU. The R value of each aerogel sheet 200 (in imperial units) can be calculated by dividing the thickness of the aerogel sheet 200 (in meters) by the thermal conductivity, and then multiplying that value by 5.7.

As noted above, the aerogel can be cellulose-based aerogel, e.g., of the nature described in International PCT Patent Application No. PCT/US2019/037122. Such aerogels can have all of the properties and features described above. Thus, in any embodiment of the present disclosure, the aerogel can optionally be cellulose-based aerogel.

In certain embodiments, the first 100 and second 110 glass sheets are part of a laminated glass assembly 80 (e.g., a laminated glass panel) that comprises at least two glass sheets, a polymer interlayer 400, and a plurality of aerogel sheets 200. Here again, the aerogel sheets 200 are arranged in a tiled configuration between two glass sheets 100, 110. Reference is made to FIG. 7. In some embodiments, the laminated glass assembly also includes a spacer. In other cases, the spacer is omitted and the laminated glass assembly just has one or more beads of sealant at the perimeter of the assembly.

In certain embodiments, both glass panes 100, 110 can be clear 3 mm soda-lime float glass and the polymer interlayer 400 can be 0.30 inch thick PVB. It is to be appreciated, however, that these details are by no means limiting.

The aerogel sheets 200 of the laminated glass assembly 80 can be arranged in the same manner, and have the same dimensions and material properties, as the aerogel sheets 200 described above for the multiple-pane insulating glazing unit 40. For example, the aerogel sheets 200 can be arranged so as to cover a majority of the unit area (and of the vision area) of the laminated glass assembly 80. In addition, in some embodiments, the tiled configuration is characterized by each of the aerogel sheets 200 being spaced from an adjacent one (or a plurality of adjacent ones) of the aerogel sheets 200 by a gap distance of no greater than 5 mm. Furthermore, if one or more visible gaps are provided between adjacent aerogel sheets, then one or more muntin bars can optionally be positioned to conceal such gap(s) from view. In other embodiments, the tiled configuration is characterized by each of the aerogel sheets 200 being in edge-to-edge contact with an adjacent one of the aerogel sheets.

The polymer interlayer 400 preferably is a tear-resistant polymer layer. In some cases, it is a sheet of ionoplast plastic. In other cases, it is a sheet of polyvinyl butyral (PVB). Various other materials known to be suitable for the interlayer of a laminated glass panel can also be used.

In some of the present laminated glass embodiments, there may be no spacer such that only one or more beads of sealant (optionally provided with a moisture vapor barrier) encompass the aerogel sheets 200.

In many cases, a laminated glass assembly is produced through two operations: (1) an assembly operation, and (2) an autoclave operation. In the assembly operation, the interlayer is positioned between two glass substrates to form a sandwich, which is then heated (commonly to a temperature of between about 120° F. and about 170° F.) and roller pressed to initiate removal of air trapped between the interlayer and to initiate adhesion of the interlayer to the glass. In the autoclave operation, the sandwich is exposed to an elevated temperature (commonly between about 275° F. and about 300° F.) and an elevated atmospheric pressure (commonly between about 150 psig and about 190 psig) until there is complete adhesion of the interlayer to the glass and complete dissolution of air trapped within the interlayer. It is not uncommon for the autoclave operation to last two hours or four hours per treatment. Various autoclave methods are known to skilled artisans.

In some embodiments involving a laminated glass assembly 80, there are two polymer interlayers 400. In some such embodiments, the plurality of aerogel sheets 200 are sandwiched between, and laminated to, the two polymer interlayers 400. In such cases, the polymer interlayers 400 are each in contact with one of the glass sheets 100, 110 on opposite sides of the aerogel sheets 200. The interlayer/aerogel/interlayer arrangement may be assembled and laminated in a single operation, or it may be assembled in a separate operation prior to being laminated.

In certain other laminated embodiments, there is only one polymer interlayer 400. In such embodiments, the aerogel sheets 200 are adhered directly to one of the two glass sheets 100, 110. Reference is made to the non-limiting example of FIG. 7.

In certain other laminated embodiments, the polymer interlayer(s) are omitted, and the aerogel replaces the interlayer(s) in the laminate. In embodiments of this nature, the lamination process still takes place, but lamination occurs at a lower pressure than it does for the other laminated embodiments.

In some cases, the laminated glass assembly 80 is made by a non-autoclave process of the nature described in U.S. Pat. Nos. 7,117,914 and 7,143,800, the teachings of which are hereby incorporated herein by reference.

While the present discussions focus on each substrate 100, 110 being a glass pane, other substrate types (e.g., polycarbonate or other polymeric materials) can alternatively be used.

This disclosure also provides methods for producing the present optical devices. In such methods, a first glass sheet 100 having a surface 120, and a second glass sheet 110 having a surface 130, are provided. The aerogel sheets 200 are produced, optionally in accordance with International PCT Patent Application No. PCT/US2019/037122, the teachings of which are incorporated herein by reference. The resulting aerogel sheets 200 are adhered to the surface 120 of the first glass sheet 100 (e.g., through van der Waals forces, or by using an optical adhesive).

In some embodiments, the aerogel is made in standard size molds and is cut to the size and shape required. In other cases, the aerogel can be made in open-top molds of a desired shape and size. After drying, the aerogel can be adhered to the glass either a) directly from the mold; b) after removing the aerogel from the mold; or c) after transferring the aerogel from the mold to some other container and then to the glass.

The aerogel may be placed either manually or, more preferably, with robotics. In some embodiments, the aerogel is adhered to a temporary surface for handling and placement. The aerogel can be picked-up using electrostatic adhesion, e.g., using commercially available Stackit robots manufactured by Grabit, Inc. (Sunnyvale, California, U.S.A.).

A low-emissivity coating 70 preferably is deposited on surface 130 of the second glass pane 110. Also, prior to applying the aerogel 200 to surface 120 of the first glass pane 100, a transparent conductive oxide coating 85 preferably is deposited on surface 125 of the first glass pane 100. These coatings can be deposited using any thin film deposition technique suitable for depositing the desired film materials at the desired thicknesses. In preferred embodiments, both coatings 70, 85 are deposited by sputtering.

Sputtering is well known. One preferred sputtering method is DC magnetron sputtering. Reference is made to Chapin's U.S. Pat. No. 4,166,018, the teachings of which are incorporated herein by reference. If desired, one or both coatings 70, 85 can be sputtered by AC or pulsed DC from a pair of cathodes. HiPIMS and other modern sputtering methods may also be used.

The two glass sheets 100, 110 can then be assembled together, using any well-known conventional techniques, with a spacer 60 and one or more edge seals 55, 58. In addition, a thermally-insulative gas mix (e.g., argon mixed with air) can be provided to fill the between-pane space. Various well-known conventional IG unit gas-filling techniques can be used. As noted above, the IG unit may be a double or triple glazing. Preferably, though, the IG unit is a double glazing, and thus is devoid of a third pane.

While some preferred embodiments of the invention have been described, it should be understood that various changes, adaptations and modifications may be made therein without departing from the spirit of the invention and the scope of the appended claims.

EMBODIMENTS

1. An optical device comprising a multiple-pane insulating glazing unit, the multiple-pane insulating glazing unit comprising two glass sheets and a between-pane space, the between-pane space being located between the two glass sheets, the multiple-pane insulating glazing unit further comprising a plurality of aerogel sheets arranged in a tiled configuration, the plurality of aerogel sheets being arranged in the tiled configuration inside the between-pane space and being adhered to an interior surface of a first one of the two glass sheets, the tiled configuration characterized by each of the aerogel sheets being spaced from an adjacent one of the aerogel sheets by a gap, each gap having a distance of no greater than 5 mm.
2. The optical device of embodiment 1 wherein the distance of each gap is in a range of from 20 μm to 2 mm.
3. The optical device of embodiment 1 or embodiment 2 wherein each gap contains only gas.
4. The optical device of any of embodiments 1-3 wherein each of the aerogel sheets has a length and a width of at least 10 cm, and wherein for each of the aerogel sheets the length, the width, or both are less than 1 m.
5. The optical device of any of embodiments 1-4 wherein the multiple-pane insulating glazing unit has a vision area, and the aerogel sheets are arranged so as to cover a majority of the vision area.
6. The optical device of embodiment 5 wherein the aerogel sheets cover at least 80% of the vision area.
7. The optical device of any of embodiments 1-6 wherein the between-pane space has a thickness, and the aerogel sheets do not occupy the entire thickness of the between-pane space, such that there is a gas gap alongside the aerogel sheets within the between-pane space.
8. The optical device of embodiment 7 wherein the aerogel sheets have a thickness, and a ratio of the thickness of the aerogel sheets to the thickness of the between-pane space is between 0.15 and 0.85.
9. The optical device of embodiment 7 or embodiment 8 wherein the thickness of the between-pane space is at least 10 mm, and the aerogel sheets have a thickness of greater than 2 mm but less than 8 mm.
10. The optical device of embodiment any of embodiments 7-9 wherein the aerogel sheets occupy less than 50% of the thickness of the between-pane space.
11. The optical device of any of embodiments 1-10 wherein the surface of the first one of the two glass sheets to which the aerogel sheets are adhered is a #3 surface of the multiple-pane insulating glazing unit.
12. The optical device of embodiment 11 wherein a second one of the two glass sheets is an outboard pane that defines a #1 surface and a #2 surface, the multiple-pane insulating glazing unit being mounted in a frame such that the #1 surface is exposed to an outdoor environment, the first one of the two glass sheets being an inboard pane and having a #4 surface exposed to an indoor environment.
13. The optical device of any of embodiments 1-12 further comprising a spacer between the two glass sheets, at least some of the aerogel sheets being separated from the spacer by about 1 mm to about 5 mm.
14. The optical device of any of embodiments 1-8 or any of embodiments 10-13 wherein each of the aerogel sheets has an index of refraction of less than 1.1 and a thickness in a range of from 1.5 mm to 15 mm.
15. The optical device of any of embodiments 1-14 wherein the aerogel sheets are adhered to the first one of the two glass sheets by an optical adhesive, such that portions of the aerogel sheets are devoid of the optical adhesive.
16. The optical device of embodiment 15 wherein the optical adhesive is located at a perimeter of each of the aerogel sheets.
17. The optical device of any of embodiments 1-16 wherein each of the aerogel sheets has a visible transmittance of greater than 90%.
18. The optical device of any of embodiments 1-17 wherein each of the aerogel sheets has a haze of less than 4% and an index of refraction of less than 1.1.
19. The optical device of any of embodiments 1-18 wherein each of the aerogel sheets has a density of less than 250 kg/m$^3$.
20. The optical device of any of embodiments 1-19 wherein each of the aerogel sheets has a thermal conductivity at atmospheric pressure of less than 0.015 W/(m·K) but greater than or equal to 0.006 W/(m·K).
21. The optical device of any of embodiments 1-10 or embodiments 13-20 wherein a surface of a second one of the two glass sheets faces the between-pane space and is a #2 surface and bears a low-emissivity coating, wherein the surface of the first one of the two glass sheets to which the aerogel sheets are adhered is a #3 surface, and wherein the aerogel sheets are spaced from the low-emissivity coating.
22. The optical device of embodiment 21 wherein the second one of the two glass sheets is an outboard pane that also has a #1 surface, the multiple-pane insulating glazing unit being mounted in a frame such that the #1 surface is exposed to an outdoor environment, the first one of the two glass sheets being an inboard pane that has a #4 surface exposed to an indoor environment.
23. The optical device of embodiment 21 or embodiment 22 wherein the aerogel sheets are spaced from the low-emissivity coating by at least 2 mm but not more than 15 mm.
24. The optical device of any of embodiments 21-23 wherein the aerogel sheets have a thickness, the between-pane space has a thickness, and a ratio of the thickness of the aerogel sheets to the thickness of the between-pane space is between 0.15 and 0.85.

25. The optical device of any of embodiments 1-24 wherein each of the aerogel sheets has a tapered edge configuration, such that each adjacent pair of the aerogel sheets has confronting tapered edges.

26. The optical device of any of embodiments 1-25 further comprising a plurality of muntin bars, wherein each gap is aligned with one of the muntin bars so as to conceal each gap from view.

27. The optical device of any of embodiments 1-25 wherein each gap is arranged as part of a gap pattern that deters bird collisions with the multiple-pane insulating glazing unit.

28. An optical device comprising a multiple-pane insulating glazing unit, the multiple-pane insulating glazing unit comprising two glass sheets and a between-pane space, the between-pane space being located between the two glass sheets, the multiple-pane insulating glazing unit further comprising a plurality of aerogel sheets arranged in a tiled configuration, the plurality of aerogel sheets being arranged in the tiled configuration inside the between-pane space and being adhered to an interior surface of a first one of the two glass sheets, the tiled configuration characterized by each of the aerogel sheets being in edge-to-edge contact with an adjacent one of the aerogel sheets.

29. The optical device of embodiment 28 wherein the multiple-pane insulating glazing unit has a vision area, and the aerogel sheets are arranged so as to cover an entirety of the vision area.

30. The optical device of embodiment 28 or embodiment 29 wherein each of the aerogel sheets has a length and a width of at least 10 cm, and wherein for each of the aerogel sheets the length, the width, or both are less than 1 m.

31. The optical device of any of embodiments 28-30 wherein the between-pane space has a thickness, and the aerogel sheets do not occupy the entire thickness of the between-pane space, such that there is a gas gap alongside the aerogel sheets within the between-pane space.

32. The optical device of embodiment 31 wherein the aerogel sheets have a thickness, and a ratio of the thickness of the aerogel sheets to the thickness of the between-pane space is between 0.15 and 0.85.

33. The optical device of embodiment 31 or embodiment 32 wherein the thickness of the between-pane space is at least 10 mm, and the aerogel sheets have a thickness of greater than 2 mm but less than 8 mm.

34. The optical device of any of embodiments 31-33 wherein the aerogel sheets occupy less than 50% of the thickness of the between-pane space.

35. The optical device of any of embodiment 28-34 wherein the surface of the first one of the two glass sheets to which the aerogel sheets are adhered is a #3 surface of the multiple-pane insulating glazing unit.

36. The optical device of embodiment 35 wherein a second one of the two glass sheets is an outboard pane that defines a #1 surface and a #2 surface, the multiple-pane insulating glazing unit being mounted in a frame such that the #1 surface is exposed to an outdoor environment, the first one of the two glass sheets being an inboard pane and having a #4 surface exposed to an indoor environment.

37. The optical device of any of embodiments 28-36 further comprising a spacer between the two glass sheets, at least some of the aerogel sheets being separated from the spacer by about 1 mm to about 5 mm.

38. The optical device of any of embodiments 28-32 or any of embodiments 34-37 wherein each of the aerogel sheets has an index of refraction of less than 1.1 and a thickness in a range of from 1.5 mm to 15 mm.

39. The optical device of any of embodiments 28-38 wherein the aerogel sheets are adhered to the first one of the two glass sheets by an optical adhesive, such that portions of the aerogel sheets are devoid of the optical adhesive.

40. The optical device of embodiment 39 wherein the optical adhesive is located at a perimeter of each of the aerogel sheets.

41. The optical device of any of embodiments 28-40 wherein each of the aerogel sheets has a density of less than 250 kg/m$^3$.

42. The optical device of any of embodiments 28-41 wherein each of the aerogel sheets has a visible transmittance of greater than 90%.

43. The optical device of any of embodiments 28-42 wherein each of the aerogel sheets has a haze of less than 4% and an index of refraction of less than 1.1.

44. The optical device of any of embodiments 28-43 wherein each of the aerogel sheets exhibits a transmitted color characterized by $a_h$ and $b_h$ color coordinates that are each between −2 and 2.

45. The optical device of any of embodiments 28-44 wherein each of the aerogel sheets has a thermal conductivity at atmospheric pressure of less than 0.03 W/(m·K).

46. The optical device of any of embodiments 28-45 wherein each of the aerogel sheets has a thermal conductivity at atmospheric pressure of less than 0.015 W/(m·K) but greater than or equal to 0.006 W/(m·K).

47. The optical device of any of embodiments 28-46 wherein each of the aerogel sheets has an R value of between 0.9 and 3.8 ft$^{2\cdot °}$ F.·h/BTU.

48. The optical device of any of embodiments 28-34 or any of embodiments 37-47 wherein a surface of a second one of the two glass sheets faces the between-pane space and is a #2 surface and bears a low-emissivity coating, wherein the surface of the first one of the two glass sheets to which the aerogel sheets are adhered is a #3 surface, and wherein the aerogel sheets are spaced from the low-emissivity coating.

49. The optical device of embodiment 48 wherein the second one of the two glass sheets is an outboard pane that also has a #1 surface, the multiple-pane insulating glazing unit being mounted in a frame such that the #1 surface is exposed to an outdoor environment, the first one of the two glass sheets being an inboard pane that has a #4 surface exposed to an indoor environment.

50. The optical device of embodiment 48 or embodiment 49 wherein the aerogel sheets are spaced from the low-emissivity coating by at least 2 mm but no more than 15 mm.

51. The optical device of any of embodiments 48-50 wherein the aerogel sheets have a thickness, the between-pane space has a thickness, and a ratio of the thickness of the aerogel sheets to the thickness of the between-pane space is between 0.15 and 0.85.

52. An optical device comprising either a multiple-pane insulating glazing unit or a laminated glass panel, the multiple-pane insulating glazing unit or laminated glass panel comprising two glass sheets and one or more aerogel sheets located between the two glass sheets, the one or more aerogel sheets being adhered to an interior surface of a first one of the two glass sheets, the one or more aerogel sheets being positioned such that when the multiple-pane insulating glazing unit or the laminated glass panel is mounted in a frame, outermost edges of the one or more aerogel sheets are outside a vision area of the multiple-pane insulating glazing unit or the laminated glass panel.

53. The optical device of embodiment 52 wherein the one or more aerogel sheets comprises only a single aerogel sheet.
54. The optical device of embodiment 52 or embodiment 53 further comprising a spacer between the two glass sheets, with the outermost edges of at least one aerogel sheet being spaced from the spacer by about 1 mm to about 5 mm.
55. The optical device of any of embodiments 52-54 wherein the one or more aerogel sheets comprises a plurality of aerogel sheets arranged in a tiled configuration.
56. The optical device of embodiment 55 wherein the multiple-pane insulating glazing unit comprises a between-pane space, the between-pane space being located between the two glass sheets, the plurality of aerogel sheets being arranged in the tiled configuration inside the between-pane space.
57. The optical device of embodiment 55 or embodiment 56 wherein the tiled configuration is characterized by each of the aerogel sheets being in edge-to-edge contact with an adjacent one of the aerogel sheets.
58. The optical device of embodiment 55 or embodiment 56 wherein the tiled configuration is characterized by each of the aerogel sheets being spaced from an adjacent one of the aerogel sheets by a gap, each gap having a distance of no greater than 5 mm.
59. The optical device of embodiment 58 wherein at least some of the gaps are located within the vision area.
60. The optical device of embodiment 58 or embodiment 59 wherein the distance of each gap is in a range of from 20 μm to 2 mm.
61. The optical device of any of embodiments 58-60 wherein each gap contains only gas.
62. The optical device of any of embodiments 52-61 wherein each of the one or more aerogel sheets has a length and a width of at least 10 cm, and wherein for each of the aerogel sheets the length, the width, or both are less than 1 m.
63. The optical device of any of embodiments 52-62 wherein the one or more aerogel sheets are arranged so as to cover a majority of the vision area.
64. The optical device of embodiment 63 wherein the one or more aerogel sheets cover at least 80% of the vision area.
65. The optical device of any of embodiments 52-64 wherein the multiple-pane insulating glazing unit comprises a between-pane space located between the two panes, the one or more aerogel sheets being arranged in the tiled configuration inside the between-pane space, the between-pane space having a thickness, and the one or more aerogel sheets do not occupy the entire thickness of the between-pane space, such that there is a gas gap alongside the one or more aerogel sheets within the between-pane space.
66. The optical device of embodiment 65 wherein the one or more aerogel sheets have a thickness, and a ratio of the thickness of the one or more aerogel sheets to the thickness of the between-pane space is between 0.15 and 0.85.
67. The optical device of embodiment 65 or embodiment 66 wherein the thickness of the between-pane space is at least 10 mm, and the one or more aerogel sheets have a thickness of greater than 2 mm but less than 8 mm.
68. The optical device of any of embodiments 65-67 wherein the one or more aerogel sheets occupy less than 50% of the thickness of the between-pane space.
69. The optical device of any of embodiments 52-68 wherein the surface of the first one of the two glass sheets to which the one or more aerogel sheets are adhered is a #3 surface of the multiple-pane insulating glazing unit.
70. The optical device of embodiment 69 wherein a second one of the two glass sheets is an outboard pane that defines a #1 surface and a #2 surface, the multiple-pane insulating glazing unit being mounted in a frame such that the #1 surface is exposed to an outdoor environment, the first one of the two glass sheets being an inboard pane and having a #4 surface exposed to an indoor environment.
71. The optical device of any of embodiments 52-66 or any of embodiments 68-70 wherein each of the aerogel sheets has an index of refraction of less than 1.1 and a thickness in a range of from 1.5 mm to 15 mm.
72. The optical device of any of embodiments 52-71 wherein the one or more aerogel sheets are adhered to the first one of the two glass sheets by an optical adhesive, such that portions of the one or more aerogel sheets are devoid of the optical adhesive.
73. The optical device of embodiment 72 wherein the optical adhesive is located at a perimeter of each of the one or more aerogel sheets.
74. The optical device of any of embodiments 52-73 wherein each of the one or more aerogel sheets has a visible transmittance of greater than 90%.
75. The optical device of any of embodiments 52-74 wherein each of the one or more aerogel sheets has a haze of less than 4% and an index of refraction of less than 1.1.
76. The optical device of any of embodiments 52-75 wherein each of the one or more aerogel sheets has a density of less than 250 kg/m$^3$.
77. The optical device of any of embodiments 52-76 wherein each of the one or more aerogel sheets has a thermal conductivity at atmospheric pressure of less than 0.015 W/(m·K) but greater than or equal to 0.006 W/(m·K).
78. The optical device of any of embodiments 52-68 or any of embodiments 71-77 wherein a surface of a second one of the two glass sheets faces the between-pane space and is a #2 surface and bears a low-emissivity coating, wherein the surface of the first one of the two glass sheets to which the one or more aerogel sheets are adhered is a #3 surface, and wherein the one or more aerogel sheets are spaced from the low-emissivity coating.
79. The optical device of embodiment 78 wherein the second one of the two glass sheets is an outboard pane that also has a #1 surface, the multiple-pane insulating glazing unit being mounted in a frame such that the #1 surface is exposed to an outdoor environment, the first one of the two glass sheets being an inboard pane that has a #4 surface exposed to an indoor environment.

80. The optical device of embodiment 78 or embodiment 79 wherein the one or more aerogel sheets are spaced from the low-emissivity coating by at least 2 mm but not more than 15 mm.

81. The optical device of any of embodiments 78-80 wherein the one or more aerogel sheets have a thickness, the between-pane space has a thickness, and a ratio of the thickness of the one or more aerogel sheets to the thickness of the between-pane space is between 0.15 and 0.85.

82. The optical device of embodiment 52 or any of embodiments 54-81 wherein each of aerogel sheets has a tapered edge configuration, such that each adjacent pair of aerogel sheets has confronting tapered edges.

83. The optical device of any of embodiments 58-82 further comprising a plurality of muntin bars, wherein each gap is aligned with one of the muntin bars so as to conceal each gap from view.

84. The optical device of any of embodiments 58-82 wherein each gap is arranged as part of a gap pattern that deters bird collisions with the multiple-pane insulating glazing unit.

85. The optical device of any of embodiments 52-57 or any of embodiments 62-82 wherein the one or more aerogel sheets are arranged so as to cover an entirety of the vision area.

86. The optical device of any of embodiments 52-85 wherein each of the one or more aerogel sheets exhibits a transmitted color characterized by $a_h$ and $b_h$ color coordinates that are each between −2 and 2.

87. The optical device of any of embodiments 52-86 wherein each of the one or more aerogel sheets has a thermal conductivity at atmospheric pressure of less than 0.03 W/(m·K).

88. The optical device of any of embodiments 52-87 wherein each of the one or more aerogel sheets has an R value of between 0.9 and 3.8 ft$^2$·° F.·h/BTU.

What is claimed is:

1. An optical device comprising:
a multiple-pane insulating glazing unit, the multiple-pane insulating glazing unit comprising two glass sheets and a between-pane space, the between-pane space being located between the two glass sheets and having a thickness, the multiple-pane insulating glazing unit further comprising a plurality of aerogel sheets arranged in a tiled configuration, the plurality of aerogel sheets being arranged in the tiled configuration inside the between-pane space and being adhered to an interior surface of a first one of the two glass sheets, the tiled configuration characterized by each of the aerogel sheets being spaced from an adjacent one of the aerogel sheets by a gap that contains only gas, each gap having a distance of no greater than 5 mm, wherein the aerogel sheets do not occupy the entire thickness of the between-pane space, such that there is a gas gap alongside the aerogel sheets within the between-pane space.

2. The optical device of claim 1 wherein the distance of each gap is in a range of from 20 μm to 2 mm.

3. The optical device of claim 1 wherein each of the aerogel sheets has a length and a width of at least 10 cm, and wherein for each of the aerogel sheets the length, the width, or both are less than 1 m.

4. The optical device of claim 1 wherein the multiple-pane insulating glazing unit has a vision area, and the aerogel sheets are arranged so as to cover a majority of the vision area.

5. The optical device of claim 1 wherein the aerogel sheets have a thickness, and a ratio of the thickness of the aerogel sheets to the thickness of the between-pane space is between 0.15 and 0.85.

6. The optical device of claim 1 wherein the thickness of the between-pane space is at least 10 mm, and the aerogel sheets have a thickness of greater than 2 mm but less than 8 mm.

7. The optical device of claim 1 wherein the surface of the first one of the two glass sheets to which the aerogel sheets are adhered is a #3 surface of the multiple-pane insulating glazing unit.

8. The optical device of claim 7 wherein a second one of the two glass sheets is an outboard pane that defines a #1 surface and a #2 surface, the multiple-pane insulating glazing unit being mounted in a frame such that the #1 surface is exposed to an outdoor environment, the first one of the two glass sheets being an inboard pane and having a #4 surface exposed to an indoor environment.

9. The optical device of claim 1 further comprising a spacer between the two glass sheets, at least some of the aerogel sheets being separated from the spacer by about 1 mm to about 5 mm.

10. The optical device of claim 1 wherein the aerogel sheets are adhered to the first one of the two glass sheets by an optical adhesive, such that portions of the aerogel sheets are devoid of the optical adhesive.

11. The optical device of claim 1 wherein each of the aerogel sheets has a haze of less than 4% and an index of refraction of less than 1.1.

12. The optical device of claim 1 wherein a surface of a second one of the two glass sheets faces the between-pane space and is a #2 surface and bears a low-emissivity coating, wherein the surface of the first one of the two glass sheets to which the aerogel sheets are adhered is a #3 surface, and wherein the aerogel sheets are spaced from the low-emissivity coating.

13. The optical device of claim 12 wherein the second one of the two glass sheets is an outboard pane that also has a #1 surface, the multiple-pane insulating glazing unit being mounted in a frame such that the #1 surface is exposed to an outdoor environment, the first one of the two glass sheets being an inboard pane that has a #4 surface exposed to an indoor environment.

14. The optical device of claim 13 wherein the aerogel sheets are spaced from the low-emissivity coating by at least 2 mm but not more than 15 mm.

15. The optical device of claim 13 wherein the aerogel sheets have a thickness, and a ratio of the thickness of the aerogel sheets to the thickness of the between-pane space is between 0.15 and 0.85.

16. The optical device of claim 1 wherein each of the aerogel sheets has a tapered edge configuration, such that each adjacent pair of the aerogel sheets has confronting tapered edges.

* * * * *